United States Patent
Cai et al.

(10) Patent No.: US 9,525,632 B1
(45) Date of Patent: Dec. 20, 2016

(54) MINIMIZE RECYCLE SYN ISSUES FOR SPLIT TCP HOT FLOWS TO IMPROVE SYSTEM RELIABILITY AND PERFORMANCE

(75) Inventors: Hao Cai, Sammamish, WA (US); Paul Imre Szabo, Seattle, WA (US); Peter M. Thornewell, Seattle, WA (US); Timothy Scott Michels, Greenacres, WA (US)

(73) Assignee: F5 Networks, Inc., Seattle, WA (US)

( * ) Notice: Subject to any disclaimer, the term of this patent is extended or adjusted under 35 U.S.C. 154(b) by 152 days.

(21) Appl. No.: 13/461,675

(22) Filed: May 1, 2012

(51) Int. Cl.
*G06F 15/173* (2006.01)
*H04L 12/801* (2013.01)
*H04L 12/851* (2013.01)

(52) U.S. Cl.
CPC .......... *H04L 47/10* (2013.01); *H04L 47/2483* (2013.01)

(58) Field of Classification Search
None
See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |
| 4,965,772 A | 10/1990 | Daniel et al. |
| 5,023,826 A | 6/1991 | Patel |
| 5,053,953 A | 10/1991 | Patel |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |

(Continued)

FOREIGN PATENT DOCUMENTS

| | | |
|---|---|---|
| EP | 0 744 850 A2 | 11/1996 |
| WO | 91/14326 A2 | 9/1991 |

(Continued)

OTHER PUBLICATIONS

FIPS 197, Advanced Encryption Standard (AES), Nov. 26, 2001, NIST, All Pages.*

(Continued)

*Primary Examiner* — Joseph E Avellino
*Assistant Examiner* — Tsung Wu
(74) *Attorney, Agent, or Firm* — John W. Branch; Lowe Graham Jones PLLC

(57) ABSTRACT

Embodiments are directed towards employing a packet traffic management device that has a split data flow segment ("DFS") and control segment ("CS") to determine if a connection flow update provided by the DFS to the CS is valid. The CS may be utilized to establish connection flows at the DFS based on connection flow requests. The CS may generate a connection flow identifier ("CFID") for a connection flow request. The CS may cache the CFID at the CS. The CS may establish a connection flow at the DFS based at least on the connection flow request and the CFID. After a connection flow is established, a DFS may provide a connection flow update and a corresponding CFID to the CS. The CS may determine that the connection flow update is valid if the corresponding CFID matches the CFID cached at the CS.

28 Claims, 13 Drawing Sheets

(56) References Cited

U.S. PATENT DOCUMENTS

| | | | |
|---|---|---|---|
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,246,684 B1 | 6/2001 | Chapman et al. |
| 6,253,230 B1 | 6/2001 | Couland et al. |
| 6,263,368 B1 | 7/2001 | Martin |
| 6,278,995 B1* | 8/2001 | Hawkinson ......... H04L 12/5693 |
| 6,327,622 B1 | 12/2001 | Jindal et al. |
| 6,374,300 B2 | 4/2002 | Masters |
| 6,396,833 B1 | 5/2002 | Zhang et al. |
| 6,601,084 B1 | 7/2003 | Bhaskaran et al. |
| 6,636,894 B1 | 10/2003 | Short et al. |
| 6,650,641 B1 | 11/2003 | Albert et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 7,343,413 B2 | 3/2008 | Gilde et al. |
| 7,561,517 B2 | 7/2009 | Klinker et al. |
| 8,024,483 B1 | 9/2011 | Rothstein et al. |
| 2001/0037387 A1 | 11/2001 | Gilde et al. |
| 2002/0138618 A1* | 9/2002 | Szabo ..................... H04L 12/26 709/225 |
| 2004/0039820 A1 | 2/2004 | Colby et al. |
| 2004/0049596 A1 | 3/2004 | Schuehler et al. |
| 2004/0111635 A1* | 6/2004 | Boivie et al. ................. 713/201 |
| 2006/0095673 A1 | 5/2006 | Van Doren et al. |
| 2007/0192861 A1 | 8/2007 | Varghese |
| 2008/0162390 A1 | 7/2008 | Kapoor et al. |
| 2008/0181226 A1 | 7/2008 | Varier et al. |
| 2008/0256239 A1 | 10/2008 | Gilde et al. |
| 2009/0003204 A1 | 1/2009 | Okholm et al. |
| 2009/0106426 A1* | 4/2009 | Chen et al. .................. 709/227 |
| 2009/0209262 A1 | 8/2009 | Stamoulis et al. |
| 2009/0327514 A1 | 12/2009 | Foschiano et al. |
| 2010/0121972 A1 | 5/2010 | Samuels et al. |
| 2010/0315992 A1* | 12/2010 | Turanyi ........................ 370/315 |
| 2011/0075675 A1 | 3/2011 | Koodli et al. |
| 2011/0179183 A1 | 7/2011 | Lindsay |
| 2012/0320788 A1 | 12/2012 | Venkataramanan et al. |
| 2013/0044741 A1 | 2/2013 | Lappetelainen et al. |
| 2013/0083661 A1 | 4/2013 | Gupta et al. |
| 2014/0036661 A1 | 2/2014 | Campbell |

FOREIGN PATENT DOCUMENTS

| | | |
|---|---|---|
| WO | 95/05712 A2 | 2/1995 |
| WO | 97/09805 A1 | 3/1997 |
| WO | 97/45800 A1 | 12/1997 |
| WO | 99/05829 A1 | 2/1999 |
| WO | 99/06913 A1 | 2/1999 |
| WO | 99/10858 A2 | 3/1999 |
| WO | 99/39373 A2 | 8/1999 |
| WO | 99/64967 A1 | 12/1999 |
| WO | 00/04422 A2 | 1/2000 |
| WO | 00/04458 A1 | 1/2000 |

OTHER PUBLICATIONS

"A Process for Selective Routing of Servlet Content to Transcoding Modules," Research Disclosure 422124, IBM Corporation, 4 pages, Jun. 1999.

"Servlet/Applet/HTML Authentication Process With Single Sign-On," Research Disclosure 429128, IBM Corporation, 4 pages, Jan. 2000.

"Transmission Control Protocol," Wikipedia, the free encyclopedia, http://en.wikipedia.org/wiki/Transmission_Control_Protocol, pp. 1-18, last accessed Aug. 1, 2012.

International Search Report and Written Opinion for International Patent Application No. PCT/US2013/038168 mailed Aug. 14, 2013.

Office Communication for U.S. Appl. No. 13/802,169 mailed on Oct. 9, 2014.

Office Communicaton for U.S. Appl. No. 13/772,194 mailed on Jul. 25, 2014.

Office Communication for U.S. Appl. No. 13/772,194 mailed on Jan. 26, 2015 (21 pages).

Office Communication for U.S. Appl. No. 13/772,194 mailed on Apr. 15, 2015 (9 pages).

Office Communication for U.S. Appl. No. 13/802,169 mailed on Feb. 5, 2015 (10 pages).

Office Communication for U.S. Appl. No. 13/802,254 mailed on May 18, 2015 (16 pages).

Office Communication for U.S. Appl. No. 13/802,169 mailed on May 27, 2015.

Office Communication for U.S. Appl. No. 13/802,331 mailed on Jun. 5, 2015.

F5 Networks, Inc., "TMOS Management Guide for BIG-IP Systems," https://support.f5.com/kb/en-us/products/big-ip_ltm/manuals/product/tmos_management_guide_10_1.html, publication date Jan. 20, 2011, accessed on Dec. 14, 2015 (520 pages).

Office Communication for U.S. Appl. No. 13/802,254 mailed on Jan. 15, 2016, 8 pages.

Office Communication for U.S. Appl. No. 13/802,331 mailed on Dec. 23, 2015, 33 pages.

Official Communication for U.S. Appl. No. 14/925,111 mailed on Feb. 23, 2016, 9 pages.

Office Communication for U.S. Appl. No. 13/772,194 mailed Jul. 28, 2015, 7 pages.

Office Communication for U.S. Appl. No. 13/802,254 mailed Sep. 14, 2015, 7 pages.

\* cited by examiner

MINIMIZE RECYCLE SYN ISSUES FOR SPLIT TCP HOT FLOWS TO IMPROVE SYSTEM RELIABILITY AND PERFORMANCE

TECHNICAL FIELD

The present invention relates generally to packet traffic management and, more particularly, but not exclusively to determining if a connection flow update provided by a data flow segment to a control segment is valid where the control segment is separate from the data flow segment.

BACKGROUND

The expanded use of the Internet has increased communication connections between client devices and server devices. Often, a client device establishes a network connection with a server device by using well-known protocols, such as Transmission Control Protocol/Internet Protocol ("TCP/IP"), User Datagram Protocol ("UDP"), and the like. This network connection may be identified by one characteristic or a combination of characteristics, such as a source port, a destination port, a source address, a destination address, a protocol, and the like. Typically, the source address, destination address, destination port, and protocol are relatively fixed for a network connection between a client device and a server device. Thus, the source port may be utilized to uniquely identify a connection between the client device and the server device. Currently, however, the number of source port values that may be utilized may be rather limited (e.g., $2^{16}$ minus 1024 (i.e., system ports assigned by the Internet Assigned Numbers Authority, as per Request for Comments (RFC) 6335)). Therefore, in situations where thousands of connections are established between a client device and a server device, the source port values may no longer uniquely identify a connection and may be cycled through and reused for different connections. Typically, a source port value may be recycled and used again under certain conditions, such as after a predetermined time limit. However, if the recycle time limit (e.g., 2 ms) is less than the amount of time a connection is established (e.g., 2 sec.), then a source port value may be recycled before a previous connection using the same source port value is closed. Furthermore, SYN flood requests might also have an identical source address, destination address, source port, destination port, and protocol type as an already established TCP connection.

Additionally, the expansion of the Internet has led to improvements in packet traffic management. One such advancement is to split operations between a control segment and a data flow segment as described in more detail in U.S. Pat. No. 7,343,413, filed Mar. 21, 2001, and entitled "Method and System for Optimizing a Network by Independently Scaling Control Segments and Data Flow," which is hereby incorporated by reference in its entirety into this patent application. However, the splitting of such operations can lead to asynchronous connection states between the control segment and the data flow segment which can slow down the load balancing of packet traffic. For example, the control segment may receive a new connection establishment request before the data flow segment notifies the control segment of a fully terminated previous connection. However, in some situations, the new connection and the previous connection may have a same connection identifier because of the recycling of source port values. As a result, the control segment may not know how to handle the notification of the previously terminated connection. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
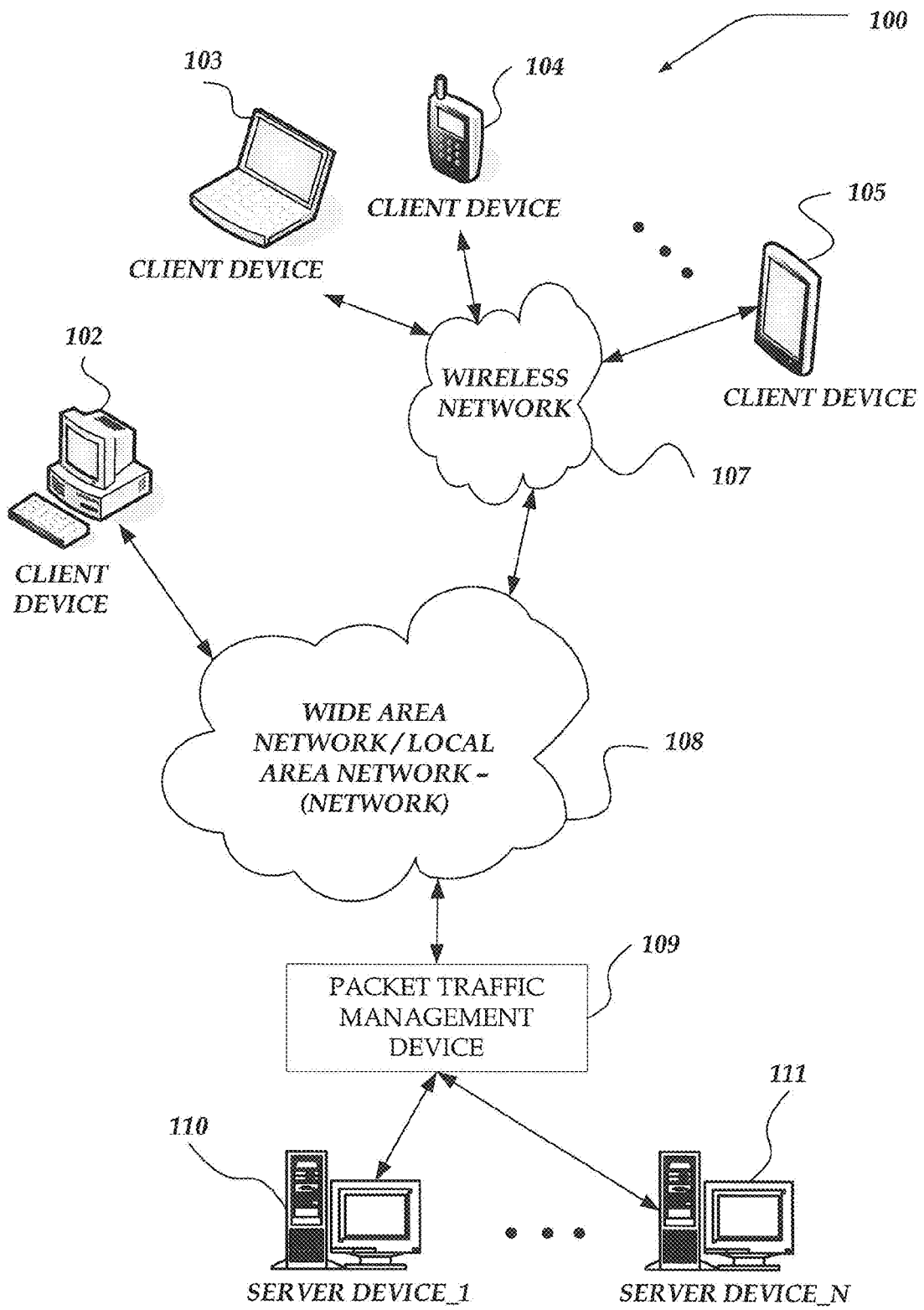
FIG. 1 illustrates a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "SYN" refers to a packet transmitted utilizing TCP that includes a set synchronize control flag in a TCP header of the packet.

As used herein, the term "ACK" refers to a packet transmitted utilizing TCP that includes a set acknowledgment flag in a TCP header of the packet.

As used herein, the term "SYN_ACK" refers to a packet transmitted utilizing TCP that includes a set synchronize control flag and a set acknowledgment flag in a TCP header of the packet.

As used herein, the term "FIN" refers to a packet transmitted utilizing TCP that includes a set no more data from sender flag in a TCP header of the packet.

As used herein, the term "FIN_ACK" refers to a packet transmitted utilizing TCP that includes a set no more data from sender flag and a set acknowledgment flag in a TCP header of the packet.

As used herein, the term "tuple" refers to a set of values that identify a connection flow signature of packets between a source and destination. In one embodiment, a 5 tuple may include a source address, a destination address, a source port, a destination port, and a protocol identifier. The source port and destination port as referenced herein refer to a TCP source port number and TCP destination port number, respectively.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards employing a packet traffic management device that employs a split data flow segment ("DFS") and control segment ("CS") to determine if a connection flow update provided by the DFS to the CS is valid. The CS may perform high-level control functions and per-flow policy enforcement for connection flows maintained at the DFS, while the DFS may perform statistics gathering, per-packet policy enforcement (e.g., packet address translations), or the like, on connection flows maintained at the DFS.

The CS may be utilized to establish connection flows at the DFS based on connection flow requests received at the packet traffic management device. In one embodiment, the CS may receive a connection flow request, such as a SYN, from a client device. The CS may generate and cache a connection flow identifier for the connection flow request. In some embodiments, the connection flow identifier may be generated from a sequence number of a SYN. In one embodiment, the CS may cache the connection flow identifier at the CS. The CS may establish a connection flow at the DFS based at least on the connection flow request and may provide the connection flow identifier to the DFS. In some embodiments, the DFS may include a plurality of DFSs. In one embodiment, a first DFS may maintain connection flows from a client device to a server device and a second DFS may maintain connection flows from a server device to a client device. In such an embodiment, each DFS may receive a same connection flow identifier generated and cached at the CS.

After a connection flow is established, a DFS may provide a connection flow update and a corresponding connection flow identifier to the CS. In some embodiments, the connection flow update may be a connection flow delete update provided by the DFS to the CS at some time after the corresponding connection flow is terminated at the DFS. In some embodiments, the DFS may provide the connection flow delete update for a terminated connection flow to the CS after the CS receives a new connection flow request. In one such embodiment, the CS may generate and cache a new connection flow identifier at the CS for the new connection flow request. The CS may determine if a connection flow update, including a connection flow delete update, is valid based on the corresponding connection flow identifier received from the DFS and the connection flow identifier cached at the CS. If the corresponding connection flow identifier received from the DFS matches the connection flow identifier cached at the CS, then the connection flow update may be identified as valid.

In at least one of the various embodiments, the connection flow identifier may uniquely identify a connection flow in addition to a more traditional 5 tuple flow signature. In some embodiments, the connection flow identifier may minimize issues related to a recycle SYN, a SYN flood, a retransmitted SYN, or the like, which may improve system reliability and/or performance. For example, in at least one embodiment, if a SYN request is received at the CS, the CS may utilize information about the SYN request and/or information stored at the CS to validate the received SYN. In various embodiments, the CS may validate the received SYN based on a connection flow signature of the received SYN, a cached connection flow identifier that corresponds to the connection flow signature, and/or a connection flow state associated with the connection flow signature.

In at least one embodiment, if a connection flow signature of a received SYN matches a connection flow signature of an established connection, then the received SYN may be identified as a recycle SYN. In at least one of the various embodiments, a generated connection flow identifier, as described herein, may be utilized to distinguish a previously established connection flow and a newly established connection flow from a recycle SYN. Furthermore, in some embodiments, utilization of the connection flow identifier, as described herein, may enable concurrency between the CS and DFS, may improve system reliability and/or performance, may minimize wait time of CS operations, and may minimize system resource utilization by the CS for state machine control of connection flows.

In some embodiments, the recycle SYN may be identified as a new SYN if the established connection is in a final closing state. In one such embodiment, the CS may establish a new connection flow at the DFS for the new SYN by generating and caching a connection flow identifier for the new SYN, as described herein. In one embodiment, the new connection flow may be established before the established connection flow in a final closing state fully closes.

In other embodiments, the recycle SYN may be identified as a network delayed retransmitted SYN if a connection flow identifier generated for the recycle SYN matches a connection flow identifier generated for the established connection flow and the established connection flow is not in a TCP final closing state. In one such embodiment, the CS may ignore the identified retransmitted SYN.

In yet other embodiments, the recycle SYN may be identified as a SYN flood if the connection flow identifier generated for the recycle SYN does not match a connection flow identifier generated for the established connection flow and the established connection flow is not in a TCP final closing state and closing acknowledge state. In one such embodiment, the CS may discard an identified SYN flood to minimize service disruption at the packet traffic management device, server devices, or the like.

The various embodiments are operative to avoid SYN flood impacts on existing TCP connections. For example, a SYN flood from the network, similar to a recycle SYN, can be directed to the CS for a not fully closed or a fully established TCP connection. Avoiding SYN flooding improves system reliability and provides immediate recycle SYN connection request handling at the appropriate TCP "close" stage before a TCP connection is fully closed. In this way, the various embodiments avoid timer based waiting which improves performance and saves system resources.

Illustrative Operating Environment

FIG. 1 shows components of one embodiment of an environment in which the invention may be practiced. Not all of the components may be required to practice the invention, and variations in the arrangement and type of the components may be made without departing from the spirit or scope of the invention.

As shown, system 100 of FIG. 1 includes local area networks ("LANs")/wide area networks ("WANs")—(network) 108, wireless network 107, client devices 102-105, packet traffic management device ("PTMD") 109, and server devices 110-111. Network 108 is in communication with and enables communication between client devices 102-105, wireless network 107, and PTMD 109. Wireless network 107 further enables communication with wireless devices, such as client devices 103-105. PTMD 109 is in communication with network 108 and server devices 110-111.

One embodiment of client devices 102-105 is described in more detail below in conjunction with FIG. 2. In one embodiment, at least some of client devices 102-105 may operate over a wired and/or a wireless network, such as networks 107 and/or 108. Generally, client devices 102-105 may include virtually any computing device capable of communicating over a network to send and receive information, including instant messages, performing various online activities, or the like. It should be recognized that more or less client devices may be included within a system such as described herein, and embodiments are therefore not constrained by the number or type of client devices employed.

Devices that may operate as client device 102 may include devices that typically connect using a wired or wireless communications medium, such as personal computers, servers, multiprocessor systems, microprocessor-based or programmable consumer electronics, network PCs, or the like. In some embodiments, client devices 102-105 may include virtually any portable computing device capable of connecting to another computing device and receiving information, such as laptop computer 103, smart phone 104, tablet computer 105, or the like. However, portable computer devices are not so limited and may also include other portable devices, such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 102-105 typically range widely in terms of capabilities and features. Moreover, client devices 102-105 may provide access to various computing applications, including a browser, or other web-based applications.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send data between another computing device. The client application may include a capability to send and/or receive content, or the like. The client application may further provide information that identifies itself, including a type, capability, name, or the like. In one embodiment, client devices 102-105 may uniquely identify themselves through any of a variety of mechanisms, including a phone number, Mobile Identification Number ("MIN"), an electronic serial number ("ESN"), or other mobile device identifier. The information may also indicate a content format that the mobile device is enabled to employ. Such information may be provided in a network packet, or the like, sent between other client devices, PTMD 109, server devices 110-111, or other computing devices.

Client devices 102-105 may further be configured to include a client application that enables an end-user to log into an end-user account that may be managed by another computing device, such as server devices 110-111, or the like. Such end-user account, in one non-limiting example, may be configured to enable the end-user to manage one or more online activities, including in one non-limiting example, search activities, social networking activities, browse various websites, communicate with other users, participate in gaming, interact with various applications, or the like. However, participation in online activities may also be performed without logging into the end-user account.

Wireless network 107 is configured to couple client devices 103-105 and its components with network 108. Wireless network 107 may include any of a variety of wireless sub-networks that may further overlay stand-alone ad-hoc networks, and the like, to provide an infrastructure-oriented connection for client devices 102-105. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) $5^{th}$ (5G) generation radio access for cellular systems, WLAN, Wireless Router ("WR") mesh, and the like. Access technologies such as 2G, 3G, 4G, 5G, and future access networks may enable wide area coverage for mobile devices, such as client devices 103-105 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), code division multiple access ("CDMA"), time division multiple access ("TDMA"), Wideband Code Division Multiple Access ("WCDMA"), High Speed Downlink Packet Access ("HS-DPA"), Long Term Evolution ("LTE"), and the like. In essence, wireless network 107 may include virtually any wireless communication mechanism by which information may travel between client devices 103-105 and another computing device, network, and the like.

Network 108 is configured to couple network devices with other computing devices, including, server devices 110-111 through PTMD 109, client device 102, and client devices 103-105 through wireless network 107. Network 108 is enabled to employ any form of computer readable media for communicating information from one electronic device to another. Also, network 108 can include the Internet in addition to LANs, WANs, direct connections, such as through a universal serial bus ("USB") port, other forms of computer readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of PTMD 109 is described in more detail below in conjunction with FIG. 3. Briefly, however, PTMD 109 may include virtually any network device capable of managing network traffic between client devices 102-105 and server devices 110-111. Such devices include, for example, routers, proxies, firewalls, load balancers, cache devices, devices that perform network address translation, or the like, or any combination thereof. PTMD 109 may perform the operations of routing, translating, switching packets, or the like. In one embodiment, PTMD 109 may inspect incoming network packets, and may perform an address translation, port translation, a packet sequence translation, and the like, and route the network packets based, at least in part, on the packet inspection. In some embodiments, PTMD 109 may perform load balancing operations to determine a server device to direct a request. Such load balancing operations may be based on network traffic, network topology, capacity of a server, content requested, or a host of other traffic distribution mechanisms.

PTMD 109 may include a control segment and a separate data flow segment. The control segment may include software-optimized operations that perform high-level control functions and per-flow policy enforcement for packet traffic management. In at least one of the various embodiments, the control segment may be configured to manage connection flows maintained at the data flow segment. In one embodiments, the control segment may provide instructions, such as, for example, a packet translation instruction, to the data flow segment to enable the data flow segment to route received packets to a server device, such as server device 110-111. The data flow segment may include hardware-optimized operations that perform statistics gathering, per-packet policy enforcement (e.g., packet address translations), or the like, on connection flows maintained at DFS between client devices, such as client devices 102-105, and server devices, such as server devices 110-111.

Server devices 110-111 may include virtually any network device that may operate as a website server. However, server devices 110-111 are not limited to website servers, and may also operate as messaging server, a File Transfer Protocol (FTP) server, a database server, content server, or the like. Additionally, each of server devices 110-111 may be configured to perform a different operation. Devices that may operate as server devices 110-111 include various network devices, including, but not limited to personal computers, desktop computers, multiprocessor systems, microprocessor-based or programmable consumer electronics, network PCs, server devices, network appliances, and the like.

Although FIG. 1 illustrates server devices 110-111 as single computing devices, the invention is not so limited. For example, one or more functions of each of server devices 110-111 may be distributed across one or more distinct network devices. Moreover, server devices 110-111 are not limited to a particular configuration. Thus, in one embodiment, server devices 110-111 may contain a plurality of network devices that operate using a master/slave approach, where one of the plurality of network devices of server devices 110-111 operate to manage and/or otherwise coordinate operations of the other network devices. In other embodiments, the server devices 110-111 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
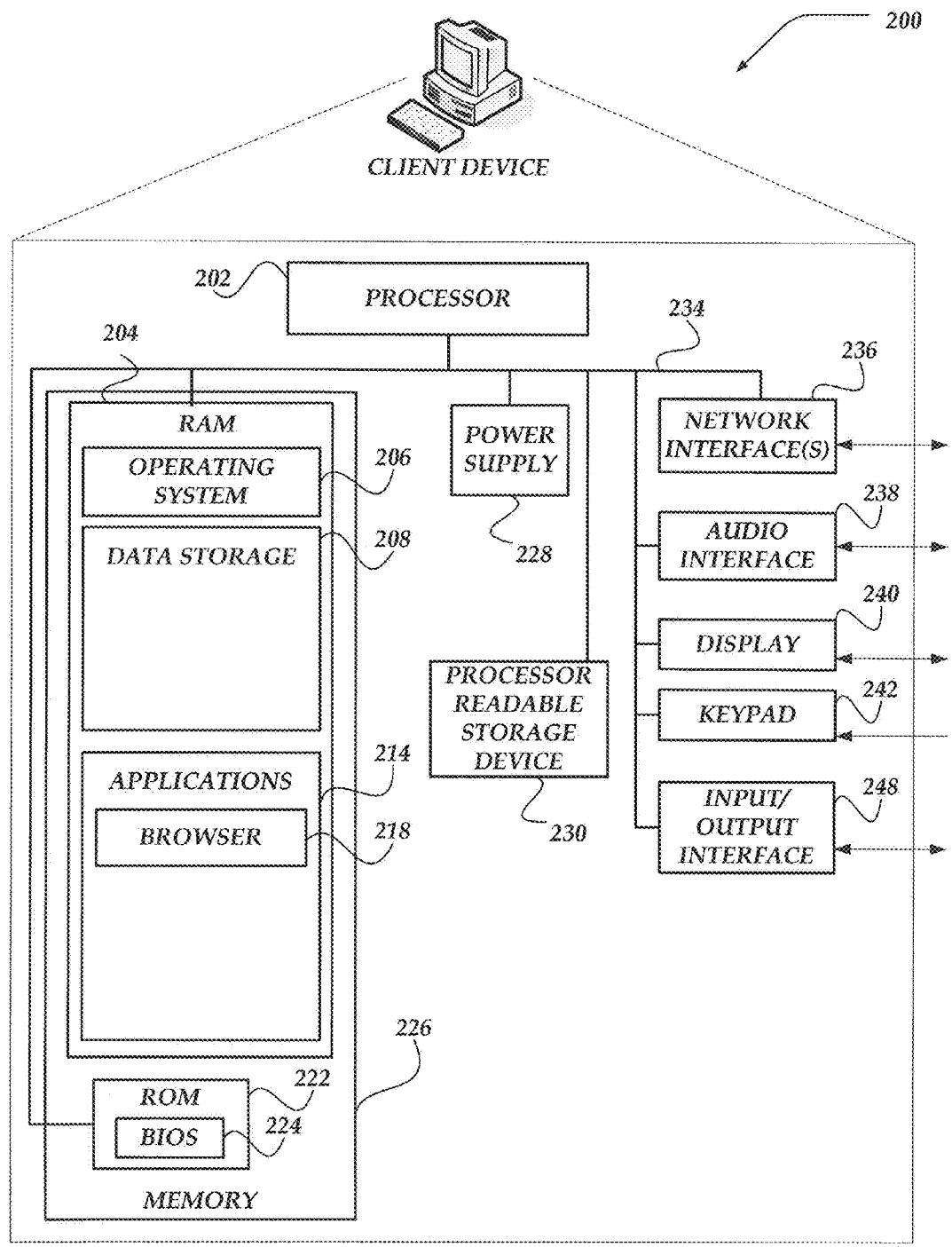
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1.

As shown in the figure, client device 200 includes a processor 202 in communication with memory 226 via a bus 234. Client device 200 also includes a power supply 228, one or more network interfaces 236, an audio interface 238, a display 240, a keypad 242, and an input/output interface 248.

Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), High Speed Downlink Packet Access ("HSDPA"), Long Term Evolution ("LTE"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display ("LCD"), gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Client device 200 may also include a GPS transceiver (not shown) to determine the physical coordinates of client device 200 on the surface of the Earth. A GPS transceiver typically outputs a location as latitude and longitude values. However, the GPS transceiver can also employ other geopositioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, a GPS transceiver can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store message, we page content, or any of a variety of user generated content. At least a portion of the information may also be stored on another component of network device 200, including, but not limited to processor readable storage device 230, a disk drive or other computer readable storage medias (not shown) within client device 200.

Processor readable storage device 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device. Processor readable storage device 230 may also be referred to herein as computer readable storage media.

Applications 214 may include computer executable instructions which, when executed by client device 200, transmit, receive, and/or otherwise process network data. Network data may include, but is not limited to, messages (e.g., SMS, Multimedia Message Service ("MMS"), instant message ("IM"), email, and/or other messages), audio, video, and enable telecommunication with another user of another client device. Applications 214 may include, for example, browser 218. Applications 214 may include other applications, which may include, but are not limited to, calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to communicate with another network device, such as PTMD 109 and/or indirectly with server devices 110-111.

Illustrative Network Device

Figure 3:
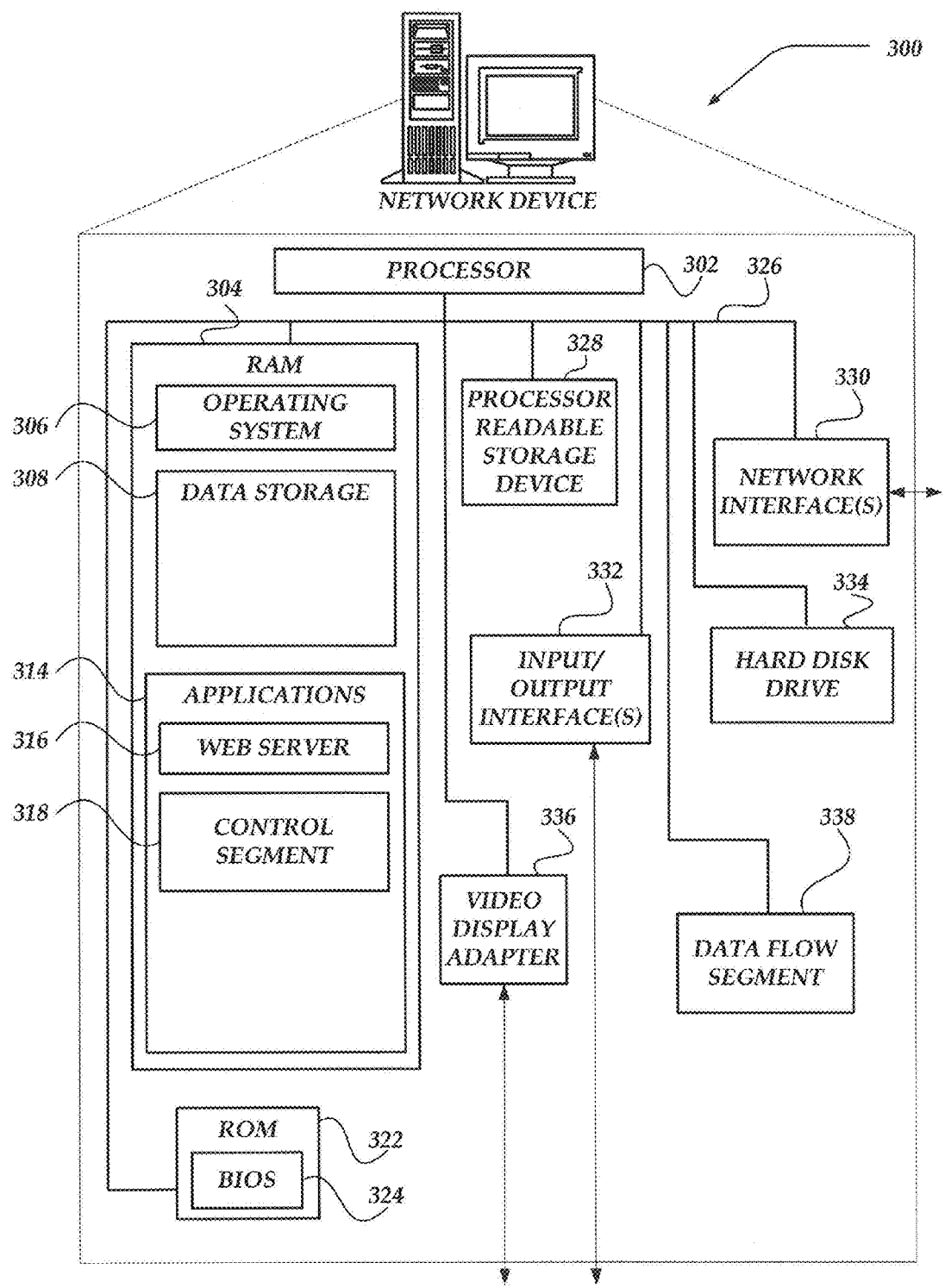
FIG. 3 illustrates an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, a host, or any other device. Network device 300 may represent, for example PTMD 109 of FIG. 1, server devices 110-111 of FIG. 1, and/or other network devices.

Network device 300 includes processor 302, processor readable storage device 328, network interface unit 330, an input/output interface 332, hard disk drive 334, video display adapter 336, data flow segment ("DFS") 338 and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. Basic input/output system ("BIOS") 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card ("NIC").

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer readable media, namely computer readable storage media and/or processor readable storage media, including processor readable storage device 328. Processor readable storage device 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as central processing unit 302 to execute and perform actions. In one embodiment, at least some of data store 308 might also be stored on another component of network device 300, including, but not limited to processor-readable storage device 328, hard disk drive 334, or the like.

The mass memory may also stores program code and data. One or more applications 314 may be loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 316 and control segment ("CS") 318 may also be included as application programs within applications 314.

Web server 316 represent any of a variety of services that are configured to provide content, including messages, over a network to another computing device. Thus, web server 316 includes, for example, a web server, a File Transfer Protocol ("FTP") server, a database server, a content server, or the like. Web server 316 may provide the content including messages over the network using any of a variety of formats including, but not limited to WAP, HDML, WML, SGML, HTML, XML, Compact HTML ("cHTML"), Extensible HTML ("xHTML"), or the like. Web server 316 may also be configured to enable a user of a client device, such as client devices 102-105 of FIG. 1, to browse websites, upload user data, or the like.

Network device 300 may also include DFS 338 for maintaining connection flows between client devices, such as client devices 102-105 of FIG. 1, and server devices, such as server devices 110-111 of FIG. 1. In one embodiment, DFS 338 may include hardware-optimized operations for packet traffic management, such as repetitive operations associated with packet traffic management. For example, DFS 338 may perform statistics gathering, per-packet policy enforcement (e.g., packet address translations), or the like, on connection flows maintained at DFS 338. In some embodiments, DFS 338 may route, switch, forward, and/or otherwise direct packets based on rules for a particular connection flow signature (e.g., a 5 tuple of a received packet). Thus, DFS 338 may include capabilities and perform tasks such as that of a router, a switch, a routing switch, or the like. In some embodiments, the rules for a particular connection flow signature may be based on instructions received from CS 318. In one embodiment, DFS 338 may store the instructions received from CS 318 in a local memory as a table or some other data structure. In some other embodiments, DFS 338 may also store a flow state table to indicate a state of current connection flows maintained at DFS 338.

In some embodiments, DFS 338 may provide connection flow updates to CS 318. In one embodiment, a connection flow update may include a status of the connection flow, a current state of the connection flow, other statistical information regarding the connection flow, or the like. The connection flow update may also include an identifier that corresponds to the connection flow. The identifier may be generated and provided by CS 318 when a connection flow is established at DFS 338. In some embodiments, the connection flow update may be a connection flow delete update provided to CS 318 after the connection flow is terminated at DFS 338. The connection flow update and/or the connection flow delete update may be provided to CS 318 periodically, at predefined time intervals, or the like. In some embodiments, DFS 338 may stagger a time when a plurality of connection flow updates are provided to CS.

In some other embodiments, DFS 338 may include a plurality of data flow segments. In one non-limiting example, a first data flow segment within DFS 338 may forward packets received from a client device to a server device, while a second data flow segment within DFS 338 may forward and/or route packets received from a server device to a client device. In at least one of the various embodiments, DFS 338 may also be implemented in software.

CS 318 may include a control segment that may include software-optimized operations to perform high-level control functions and per-flow policy enforcement for packet traffic management. CS 318 may be configured to manage connection flows maintained at DFS 338. In one embodiments, CS 318 may provide instructions, such as, for example, a packet address translation instructions, to DFS 338 to enable DFS 338 to forward received packets to a server device, such as server device 110-111 of FIG. 1. In some other embodiments, CS 318 may forward and/or route packets between a client device and a server device independent of DFS 338.

In at least one of the various embodiments, CS 318 may include a plurality of control segments. In some embodiments, a plurality of control segments may access and/or manage connection flows at a single data flow segments and/or a plurality of data flow segments. In some other embodiments, CS 318 may include an internal data flow segment. In one such embodiment, the internal data flow segment of CS 318 may be distributed and/or separate from CS 318. For example, in one embodiment, CS 318 may be employed in software, while the internal data flow segment may be employed in hardware. In some other embodiments, CS 318 may identify if connection flows are split between different data flow segments and/or between a DFS 338 and CS 318. In at least one embodiment, CS 318 may also be implemented in hardware.

In at least one of the various embodiments, CS 318 may be configured to generate an identifier for each connection flow established at DFS 338. In some embodiments, CS 318 may utilize a sequence number of a SYN to generate an identifier for a corresponding connection flow. In one embodiment, the identifier may be based on a hash of the sequence number. In another embodiment, the identifier may be based on an exclusive OR byte operation of the sequence number. CS 318 may cache the identifier at CS 318 and may provide the identifier to DFS 338. In some embodiments, CS 318 may cache an identifier for each connection flow it establishes at DFS 338.

CS 318 may be configured to receive connection flow updates with a corresponding connection flow identifier from DFS 338. CS 318 may determine if the connection flow update is valid based on the corresponding connection flow identifier. In one embodiment, if the corresponding connection flow identifier matches the cached identifier, then the connection flow update may be valid; otherwise, the connection flow update may be invalid.

System Overview

Figure 4A:
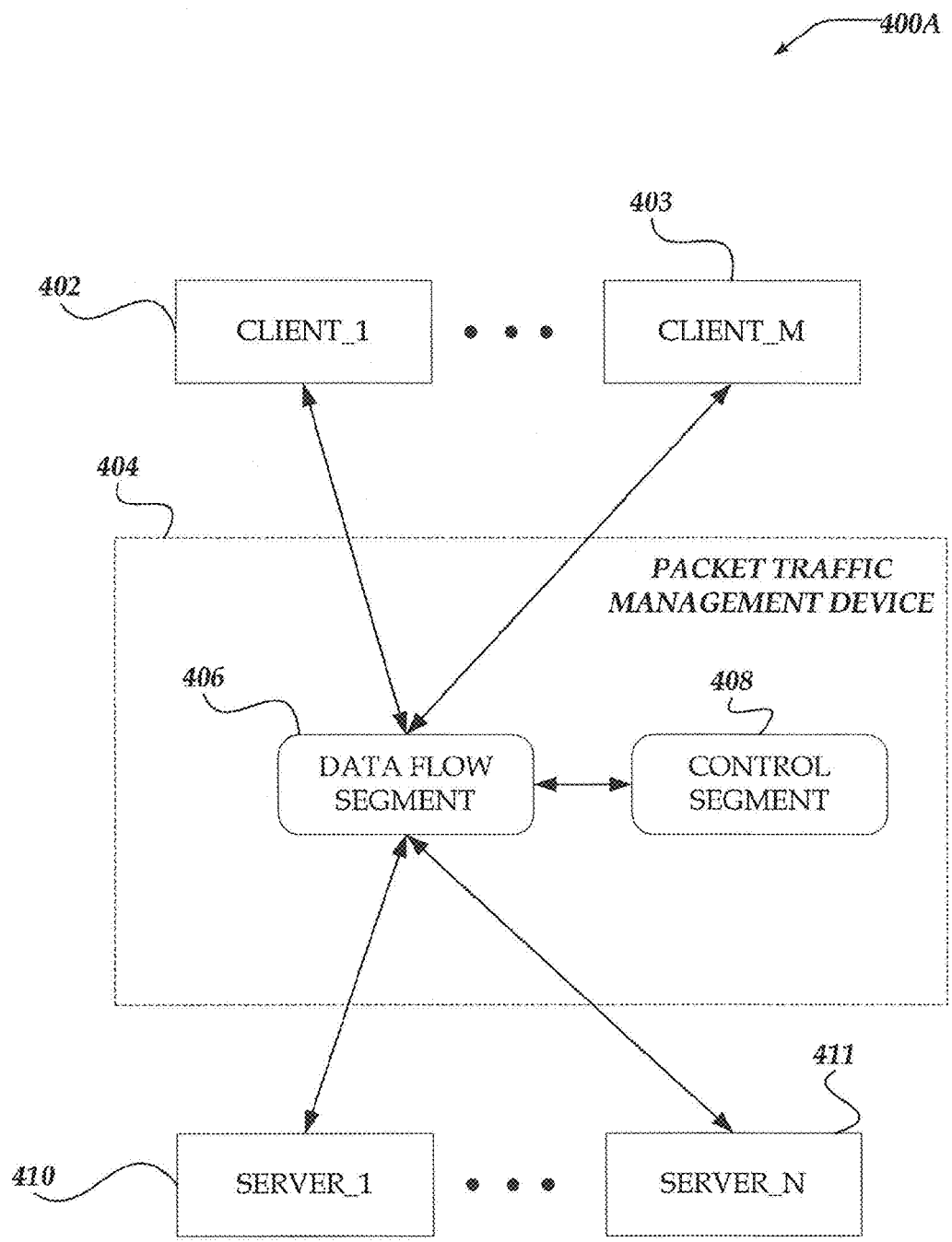
FIGS. 4A and 4B show overview system diagrams generally showing embodiments of a packet traffic management device disposed between client devices and server devices.

FIG. 4A illustrates a system diagram generally showing one embodiment of a system with a packet traffic management device disposed between client devices and server devices. System 400A may include packet traffic management device ("PTMD") 404 disposed between client devices 402-403 and server devices 410-411. Client devices 402-403 may include Client_1 through Client_M, which may include one or more client devices, such as client devices 200 of FIG. 2. Server devices 410-411 may include Server_1 through Server_N, which may include one or more server devices, such as server devices 110-111 of FIG. 1.

In one embodiment, PTMD 404 may be an embodiment of PTMD 109 of FIG. 1. PTMD 404 may include data flow segment ("DFS") 406 in communication with control segment ("CS") 408. In at least one of the various embodiments, DFS 406 may be an embodiment of DFS 338 of FIG. 3, and CS 408 may be an embodiment of CS 318 of FIG. 3.

CS 408 may be configured to communicate with DFS 406, client devices 402-403 and/or server devices 410-411 independent of DFS 406, and/or any combination thereof. CS 408 may establish connection flows at DFS 406. In some embodiments, CS 408 may establish a connection flow at DFS 406 by providing instructions to DFS 406 to enable DFS 406 to forward packets received at PTMD 404. In one embodiment, CS 408 may perform a load balancing operation to select a server device of server devices 410-411 to receive packets sent from a client device, such as client device 402. In some other embodiments, CS 408 may generate and cache a connection flow identifier to be provided to DFS 406 when the connection flow is established.

DFS 406 may be configured to facilitate communications between client devices 402-403 and server devices 410-411. DFS 406 may process and forward packets received at PTMD 404 based on the instructions received from CS 408. For example, in one embodiment, DFS 406 utilize the instructions to forward packets received from client device 402 to server device 410 and to forward packets received from server device 410 to client device 402. In some embodiments, DFS 406 may forward predetermined packets to CS 408, such as, but not limited to, new connection flow requests (e.g., a SYN). In yet other embodiments, DFS 406 may notify CS 408 that a packet was received and forwarded. In one non-limiting, non-exhaustive example, DFS 406 may notify CS 408 that an ACK was received from client device 402 and forwarded to server device 410. In at least one of the various embodiments, DFS 406 may also provide connection flow updates and a corresponding connection flow identifier to CS 408. CS 408 may compare the corresponding connection flow identifier with the cached identifier to determine if the connection flow update is valid.

Although PTMD 404 illustrates DFS 406 and CS 408 as two partitions within a single PTMD 404, the invention is not so limited. Rather, in some embodiments, DFS 406 and CS 408 may be functional blocks in a same PTMD 404 (i.e., a same chassis/computing device). In other embodiments, DFS 406 may be implemented by one or more chassis/computing devices separate from one or more other chassis/computing devices that may be utilized to implement CS 408. In yet other embodiments, CS 408 may be a module that plugs into DFS 406. Additionally, it is envisaged that the functionality of either DFS 406 and/or CS 408 may be separately implemented in software and/or hardware.

Figure 4B:
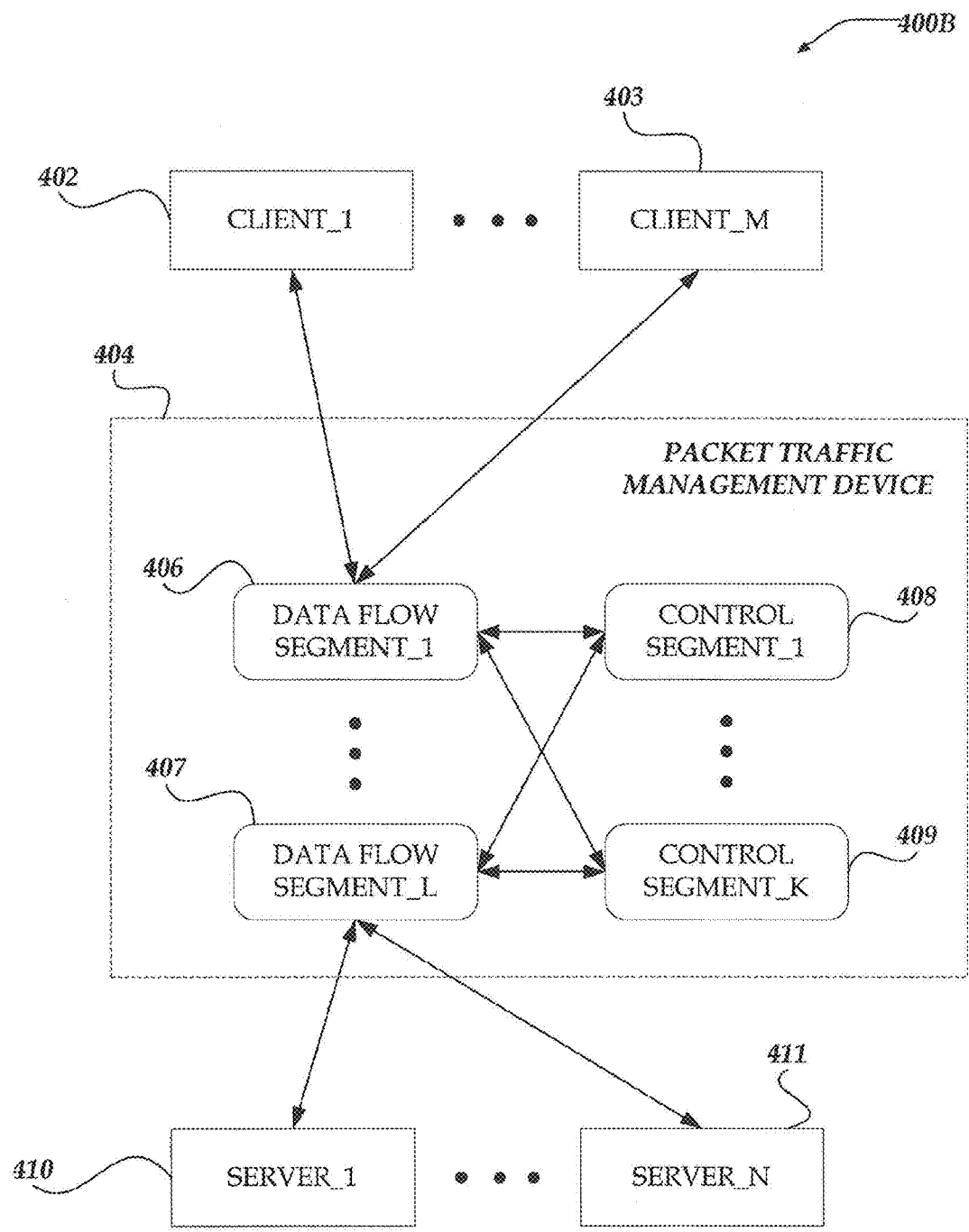

FIG. 4B illustrates a system diagram generally showing one embodiment of a system with a packet traffic management device disposed between client devices and server devices. System 400B may include packet traffic management device ("PTMD") 404 disposed between client devices 402-403 and server devices 410-411. Client devices 402-403 may include Client_1 through Client_M, which may include one or more client devices, such as client devices 102-105 of FIG. 1. Server devices 410-411 may include Server_1 through Server_N, which may include one or more server devices, such as server devices 110-111 of FIG. 1.

In one embodiment, PTMD 404 may be an embodiment of PTMD 404 of FIG. 4. PTMD 404 may include data flow segments ("DFS") 406-407 and control segments ("CS") 408-409. DFS 406-407 may include a plurality of data flow segments, each of which may be an embodiment of DFS 406 of FIG. 4A. CS 408-409 may include a plurality of control flow segments, each of which may be an embodiment of CS 408 of FIG. 4.

In some embodiments, data communicated between client devices 402-403 and server devices 410-411 may flow through one or more data flow segments 406-407. In one embodiment, data from client devices 402-403 may flow through a first DFS, such as DFS 406 and data from server devices 410-411 may flow through a second DFS, such as DFS 407.

In at least one of the various embodiments, one or more data flow segments of DFS 406-407 may communicate with one or more control segments of CS 408-409. Similarly, one or more control segments of CS 408-409 may communicate with one or more data flow segments of DFS 406-407. In some embodiments, each control segment of CS 408-409 may communicate (not shown) with other control segments of CS 408-409. In other embodiments, each data flow segment of DFS 406-407 may communicate (not shown) with other data flow segments of DFS 406-407.

General Operation

Figure 5:
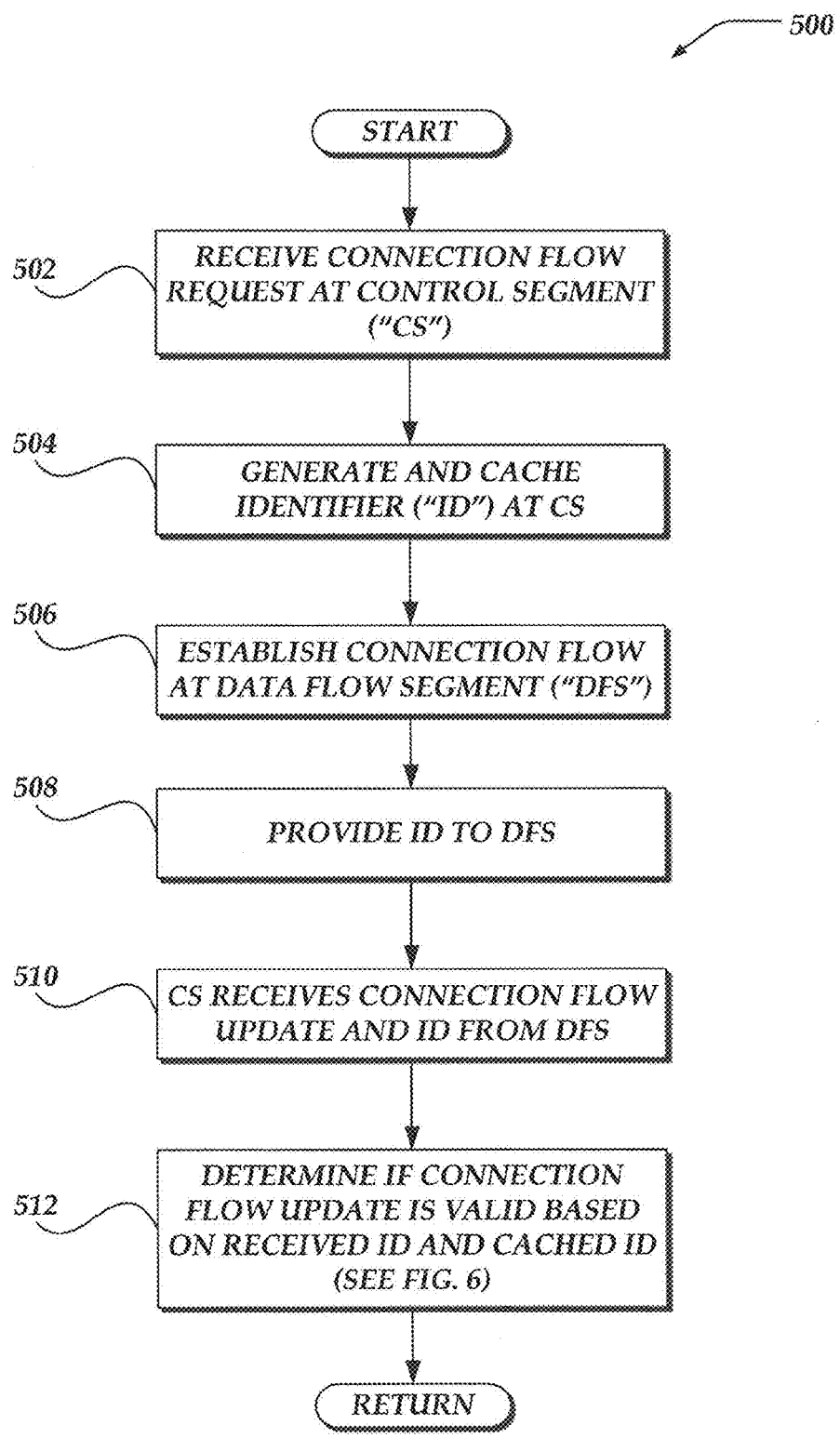
FIG. 5 illustrates a logical flow diagram generally showing one embodiment of an overview process for enabling a control segment to generate and cache an identifier, to establish a connection flow at a data flow segment with the generated identifier, and to determine if a connection flow update received at the control segment from the data flow segment is valid, such that if an identifier received with the connection flow update from the data flow segment is different than an identifier cached at the control segment but with a same connection flow signature, then the control segment may perform traffic statistics updates instead of control state updates.

The operation of certain aspects of the invention will now be described with respect to FIGS. 5-7. FIG. 5 illustrates a logical flow diagram generally showing one embodiment of an overview process for enabling a control segment to establish a connection flow at a data flow segment and to determine if a connection flow update received at the control segment from the data flow segment is valid for an established connection flow (e.g., determine if the connection flow update is late, current, or the like). In some embodiments, process 500 of FIG. 5 may be implemented by and/or executed on a single network device, such as network device 300 of FIG. 3. In other embodiments, process 500 or portions of process 500 of FIG. 5 may be implemented by and/or executed on a plurality of network devices, such as network device 300 of FIG. 3.

Process 500 begins, after a start block, at block 502, where a connection flow request is received at a control segment ("CS"), such as CS 318 of FIG. 3. In some embodiments, the CS may receive the connection flow request from a client device and/or a server device. In other embodiments, the CS may receive the connection flow request from a data flow segment ("DFS"). In such an embodiment, the DFS may receive the connection flow request from a client device and/or server device and may forward the connection flow request to the CS. In at least one of the various embodiments, the connection flow request may be a SYN sent from a client device (e.g., client device 102-105 of FIG. 1) to establish a TCP connection with a server device (e.g., server device 110-111 of FIG. 1).

Process 500 continues at block 504, where the CS generates and caches an identifier for the connection flow request. In one embodiment, the identifier may be referred to as a connection flow identifier ("CFID"). In some embodiments, the CFID may be generated based on a sequence number of a connection flow request. In one non-limiting, non-exhaustive example, a 32-bit sequence number of a SYN may be utilized to generate an 8-bit CFID. In one embodiment, the CFID may be based on a hash of the sequence number. In another embodiment, the CFID may be based on a hash of a SYN sequence number and a connection flow signature of the SYN. In yet another embodiment, the CFID may be based on an exclusive OR byte operation of the sequence number. However, the invention is not so limited, and other methods and/or algorithms may be utilized to generate the CFID to uniquely identify a connection flow. For example, in other embodiments, the CFID may be an arbitrary number generated by the CS that uniquely identifies a connection flow. Furthermore, the invention is not limited to a specific size of CFID, but rather, the CFID may comprise other numbers of bits determined utilizing engineering judgment. For example, in other embodiments, the CFID may be an arbitrary number generated by the CS that uniquely identifies a connection flow.

In at least one of the various embodiments, the CS may cache the CFID. In some embodiments, the CS may cache one CFID for each of a plurality of different connection flows. In some embodiments, the CS may maintain the CFID in the CS cache until a corresponding connection flow is terminated at the CS.

In at least one embodiment, the CS may maintain a list of previously generated CFIDs for at least one connection flow signature of a previously established connection flow. In some embodiments, the CS can utilize the list of previous CFIDs to compare with a CFID received with a connection flow update from the DFS to determine a validity of the connection flow update. In other embodiments, the CS can utilize the list of previous CFIDs to compare with a received new connection flow request to determine if the new connection flow request is a SYN flood, a retransmitted SYN, or the like. In one such embodiment, a new connection flow request may be a recycle SYN if a connection flow signature of the new connection flow request matches a connection flow signature of a currently established connection flow. The recycled SYN may, in at least one embodiment, be identified as a TCP SYN flood if a CFID generated for the new connection flow request is different than a CFID for the established connection flow. In another embodiment, the recycled SYN may be identified as a TCP retransmitted SYN if a CFID generated for the new connection flow request matches a CFID for the established connection flow. In at least one of the various embodiments, a SYN flood and/or a retransmitted SYN may be ignored by the CS and/or the DFS.

Processing then flows to block 506, where a connection flow is established at the DFS. In some embodiments, the CS may establish a connection flow at the DFS by providing the DFS processing instructions for the connection flow. In one embodiment, the processing instructions may include information that enables the DFS forward and/or route packets received from one device to a second device. In at least one of the various embodiments, the processing instruction may include packet address translation instructions. For example, in one embodiment, packets received with a first 5 tuple may be modified to include a second 5 tuple. Similarly, packets received with the second 5 tuple may be modified to include the first 5 tuple.

In at least one of the various embodiments, the processing instructions may include client side instructions and server side instructions. The client side instructions may include packet address translation instructions for packets received from a client device and the server side instructions may include packet address translation instructions for packets received from a server device. In some embodiments, the CS may perform a load balancing operation to generate the client side instructions.

In some embodiments, the CS may establish connection flows at a plurality of DFSs. In one embodiment, the CS may establish a different connection flow at each DFS for the same connection flow request. For example, the CS may establish a first connection flow at a first DFS for packets received from one or more client devices and a second connection flow at a second DFS for packets received from one or more server devices. In establishing the connection flows at the first and second DFS, the CS may provide client side instructions to the first DFS and server side instructions to the second DFS. However, the invention is not so limited and other methods for establishing a connection flow at the DFS and the number of DFSs may also be employed.

In some other embodiments, the CS and the DFS may asynchronously manage connection flows established at the DFS. In one embodiment, the CS and the DFS may maintain information regarding connection flows established at the DFS independent of each other. Such information may include, but is not limited to, connection flow state information, connection flow statistical information, or the like. Thus, in some embodiments, information regarding a connection flow maintained at the CS may be different than information regarding the same connection flow maintained at the DFS. For example, in one embodiment, the CS may receive periodic connection flow updates from the DFS. Thus, the information maintained at the CS may be outdated compared to the information maintained at the DFS.

In any event, process 500 next flows to block 508, where the CS provides the generated CFID to the DFS. In one embodiment, the CS may provide the CFID to each DFS when a connection flow is established, such as, for example, with the processing instructions are provided to the DFS from the CS. In at least one of the various embodiments, the DFS may maintain and/or store the CFID until the DFS completely terminates the connection flow. In some embodiments, the DFS may completely terminate the connection flow by providing a connection flow delete update to the CS after a connection flow termination request is received at the DFS.

Process 500 next continues at block 510, where the CS receives a connection flow update and a corresponding CFID from the DFS. In at least one of the various embodiments, the connection flow update may include: a status of the connection flow at the DFS, a current state of the connection flow at the DFS, a sequence number of a last packet received for the connection flow at the DFS, other traffic statistical information, any combination thereof, or the like.

In some embodiments, the connection flow update may be provided to the CS periodically, at predefined time intervals, or the like. In some embodiments, the connection flow update may be provided to the CS at a time after the DFS terminates the connection flow at the DFS, which may be referred to as a connection flow delete update. In one embodiment, the connection flow delete update may be provided to the CS at a time after the CS establishes a new connection flow at the DFS. In any event, the connection flow update may include the CFID.

Process 500 then proceeds to block 512, which is described in more detail below in conjunction with FIG. 5. Briefly, however, at block 512, a determination may be made whether the connection flow update is valid based on the received CFID and the CFID cached at the CS. In one embodiment, the connection flow update may be valid if the received CFID matches the CFID cached at the CS.

After block 512, process 500 returns to a calling process to perform other actions.

Figure 6:
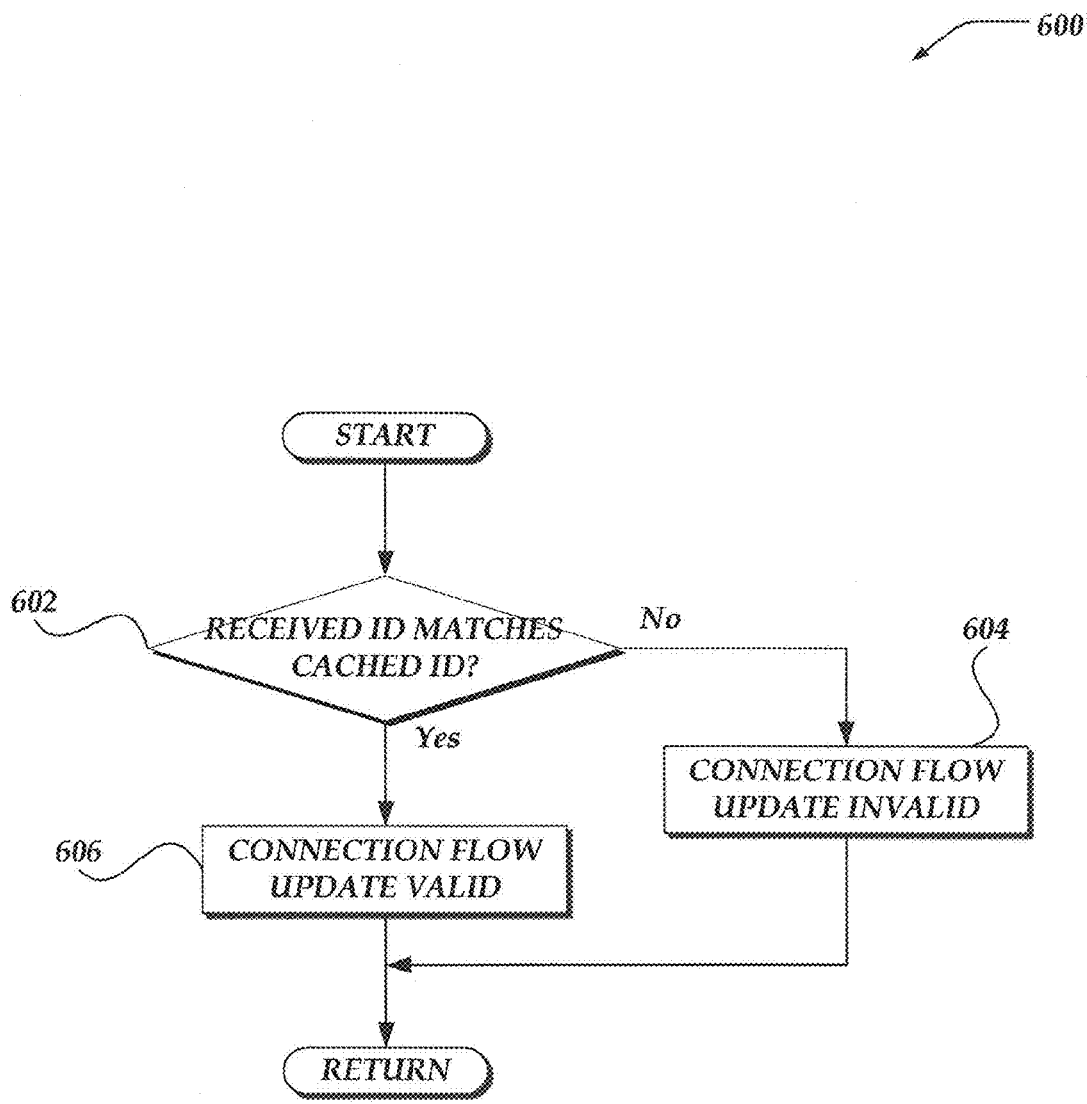
FIG. 6 shows a logical flow diagram generally showing one embodiment of a process for determining if a connection flow update is valid based on a comparison of a received identifier from a data flow segment and a cached identifier at a control segment, such that if the received identifier is different than the cached identifier but with a same connection flow signature, then the connection flow update may be invalid and the control segment may perform traffic statistics updates but not control state updates.

FIG. 6 illustrates a logical flow diagram generally showing one embodiment of a process for determining if a connection flow update is valid based on a comparison of a received identifier and a cached identifier. In some embodiments, process 600 of FIG. 6 may be implemented by and/or executed on a single network device, such as network device 300 of FIG. 3. In other embodiments, process 600 or portions of process 600 of FIG. 6 may be implemented by and/or executed on a plurality of network devices, such as network device 300 of FIG. 3.

Process 600 begins, after a start block, at decision block 602, where a determination may be made whether a CFID received at the CS from the DFS matches a CFID cached at the CS. In one embodiment, the received CFID may be compared to the cached CFID. If the CFID received from the DFS matches the CFID cached at the CS, then processing flows to block 606; otherwise, processing flows to block 604.

At block 606, the connection flow update may be identified as valid. In some embodiments, the CS may update information contained at the CS based on the valid connection flow update. As described above, the CS and the DFS may maintain connection flow state information, connection flow statistical information, or the like independent of each other. Thus, in one embodiment, the CS may utilize the valid connection flow update to update state information at the CS. In another embodiment, the CS may update statistical information at the CS based on statistical information within the valid connection flow update.

If, at decision block 602 the CFID received from the DFS does not match the CFID cached at the CS, then processing flows to block 604. At block 604, the connection flow update may be identified as invalid. In at least one embodiment, the connection flow update may be identified as invalid for a currently established connection, but may be valid for a previously established connection. In some embodiments, all or at least a subset of the data of the invalid connection flow update may be discarded and not utilized. In other embodiments, the CS may utilize a subset of information within the invalid connection flow update. For example, in at least one embodiment, the CS may update virtual server and/or server pool statistics related to the previously established connection based on information associated with the connection flow update. In such an embodiment, the CS may not update a connection flow control status (e.g., a connection flow state, a latest sequence number received at the DFS, or the like) of the currently established connection.

After block 604 and block 606, process 600 returns to a calling process to perform other actions.

Figure 7:
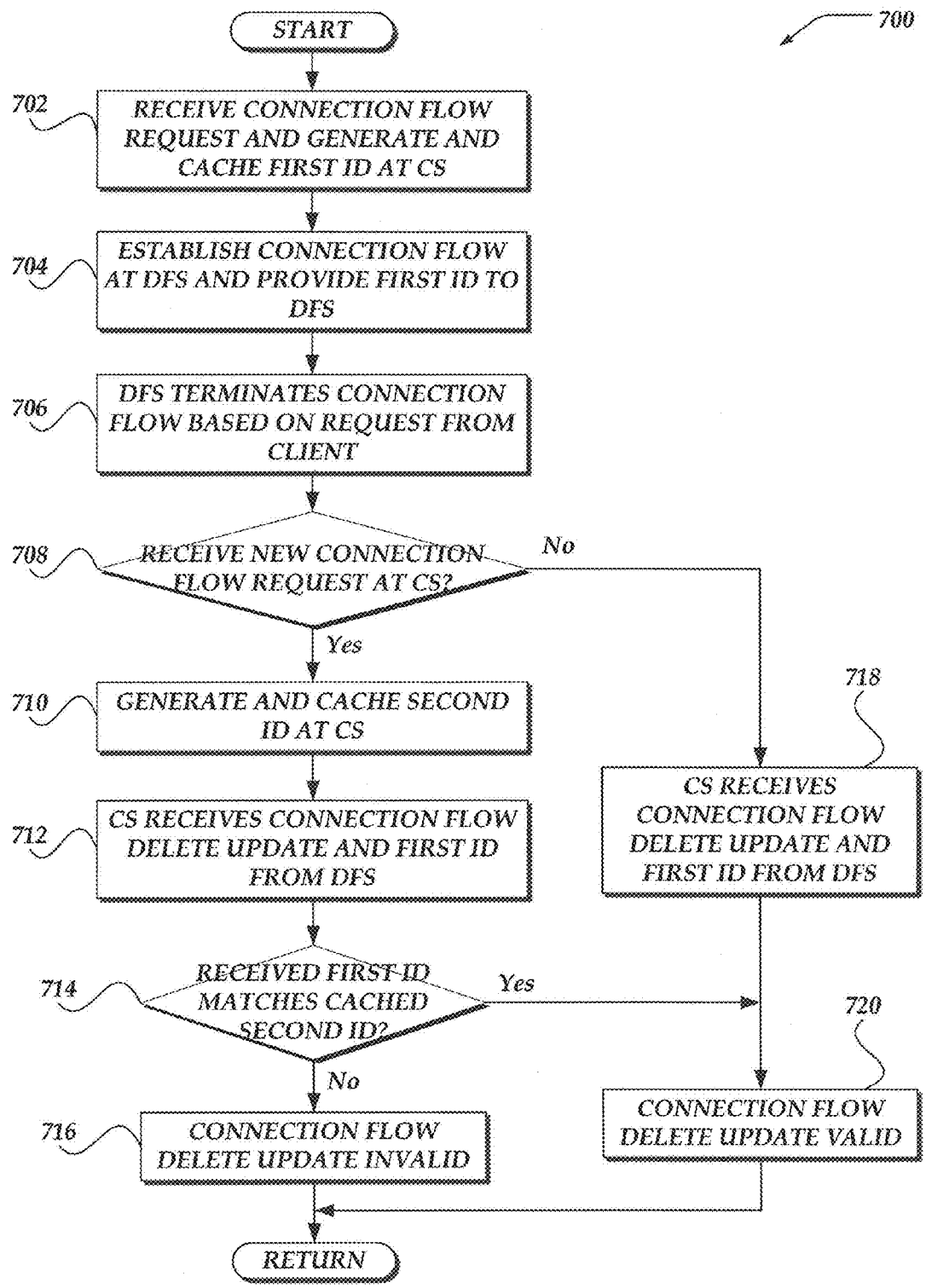
FIG. 7 illustrates a logical flow diagram generally showing one embodiment of a process for enabling a control segment to receive a new connection flow request after a data flow segment terminates previous connection flow, but before the control segment receives a connection flow delete update from the data flow segment.

FIG. 7 illustrates a logical flow diagram generally showing one embodiment of a process for enabling a control segment to receive a new connection flow request after a data flow segment terminates previous connection flow, but before the control segment receives a connection flow delete update from the data flow segment. In some embodiments, process 700 of FIG. 7 may be implemented by and/or executed on a single network device, such as network device 300 of FIG. 3. In other embodiments, process 700 or portions of process 700 of FIG. 7 may be implemented by and/or executed on a plurality of network devices, such as network device 300 of FIG. 3.

Process 700 begins, after a start block, at block 702, where a connection flow request may be received at the CS. In one embodiment, block 702 may employ embodiments of block 502 of FIG. 5 to receive a connection flow request at the CS. Furthermore, at block 702, the CS may generate and cache a first identifier. In one embodiment, block 702 may employ embodiments of block 504 of FIG. 5 to generate and cache a first identifier at the CS. In some embodiments, the first identifier may be referred to as a first CFID.

Continuing to block 704, a connection flow may be established at the DFS. In one embodiment, block 704 may employ embodiments of block 506 of FIG. 5 to establish a connection flow at the DFS. Furthermore, at block 704, the CS may provide the first CFID to the DFS. In some embodiments, block 704 may employ embodiments of block 508 of FIG. 5 to provide the first CFID to the DFS.

Process 700 continues at block 706, where the DFS terminates the connection flow based on a request from a client device. In at least one of the various embodiments, the termination request may be a FIN sent from the client device. The DFS may delete and/or otherwise invalidate processing instructions that correspond to the connection flow termination request. In some embodiments, the DFS may forward the connection flow termination request to the CS, which may forward the termination request to the server device. In other embodiments, the DFS may forward the termination request to a server device associated with the connection flow and may notify the CS that a termination request was received. In some other embodiments, the connection flow termination request may be received from the server device.

Proceeding next to decision block 708, a determination may be made whether a new connection flow request is received at the CS. A new connection flow request may be received, in some embodiments, similar to receiving a connection flow request at block 502 of FIG. 5. In at least one embodiment, the new connection flow request may have a connection flow signature that matches a connection flow of a previously established connection flow. In such an embodiment, the new connection flow request may be identified as a recycled SYN. If a new connection flow request is received at the CS, processing flows to block 710; otherwise, processing flows to block 718.

At block 718, the CS may receive a connection flow delete update and the first CFID from the DFS. In at least one of the various embodiments, block 718 may employ embodiments of block 510 of FIG. 5 to receive the connection flow delete update and first CFID from the DFS. Processing then flows to block 720.

If, at decision block 708, a new connection flow request is received at the CS, then processing flows to block 710. At block 710, the CS may generate and cache a second CFID at the CS. In some embodiments, block 710 may employ embodiments of block 504 of FIG. 5 to generate and cache a second CFID at the CS. In at least one of the various embodiments, the CS may establish a new connection flow at the DFS based at least on the new connection flow request. In one such embodiment, block 710 may employ embodiments of block 506 of FIG. 5 to establish a new connection flow at the DFS.

Process 700 continues at block 712, where the CS receives a connection flow delete update and the first CFID from the DFS. In at least one of the various embodiments, block 712 may employ embodiments of block 510 of FIG. 5 to receive a connection flow delete update and first CFID. In some embodiments, a new connection flow may be established at the DFS (e.g., at block 710) at a time before the DFS sends the connection flow delete update to the CS. In one such embodiment, the connection flow delete update and first CFID may be for a previous connection flow that was previously terminated at the DFS (e.g., at block 706).

In any event, process 700 continues at decision block 714, where a determination may be made whether the received first CFID matches the cached second CFID. In at least one of the various embodiments, decision block 714 may employ embodiments of decision block 602 of FIG. 6 to determine whether the received first CFID matches the cached second CFID. If the received first CFID matches the cached second CFID, then processing flows to block 720; otherwise, processing flows to block 716.

At block 720, the connection flow delete update may be identified as valid. In some embodiments, block 720 may employ embodiments of block 606 of FIG. 6 where the connection flow delete update may be identified valid. Process 700 then returns to a calling process to perform other actions.

If, at decision block 714, the received first CFID does not match the cached second CFID, then process 700 flows to block 716. At block 716, the connection flow delete update may be identified as invalid. In at least one of the various embodiments, block 716 may employ embodiments of block 604 of FIG. 6 where the connection flow delete update may be identified as invalid. Process 700 then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Use Case Illustrations

Figure 8:
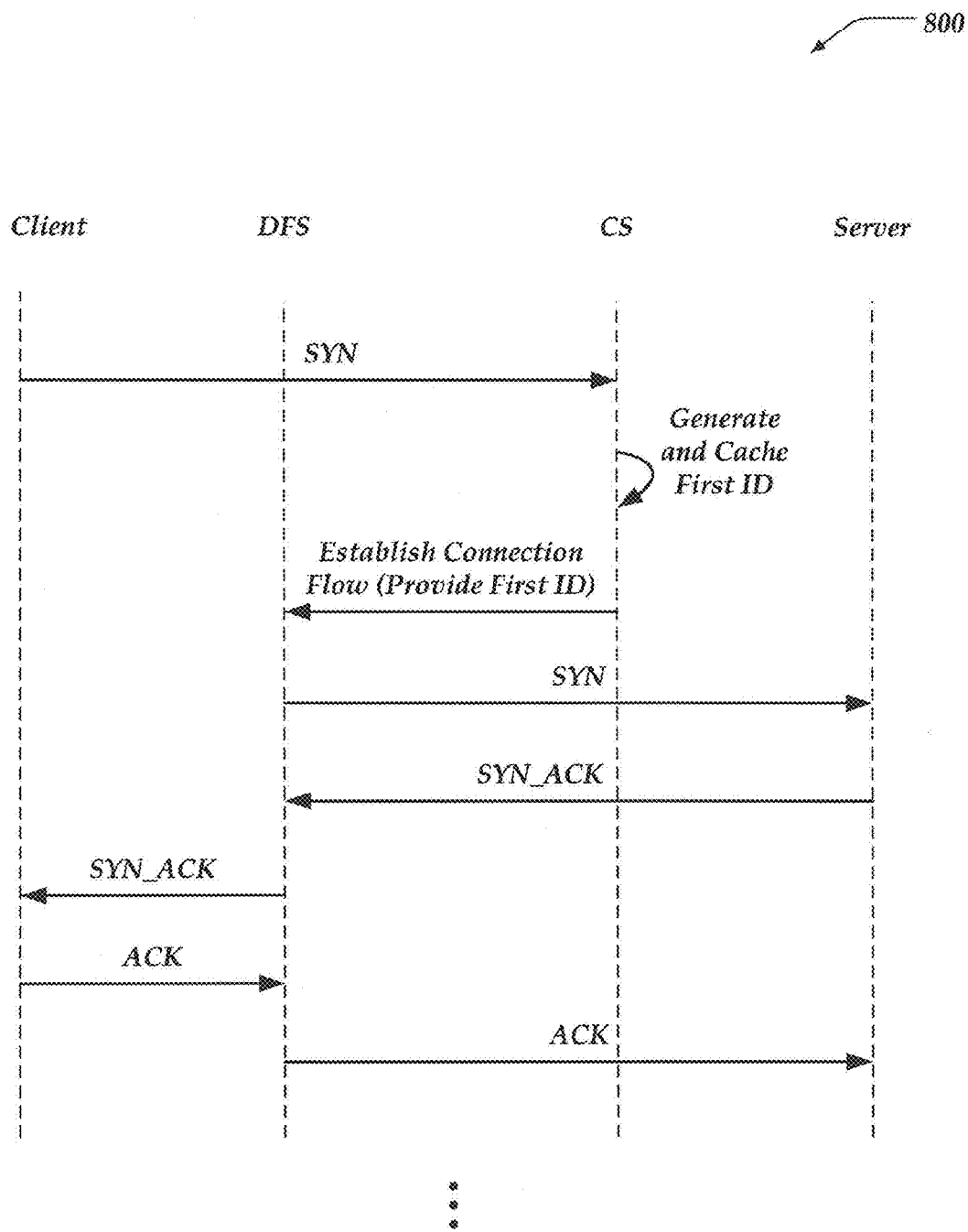
FIG. 8 shows a sequence diagram generally showing one embodiment of a sequence for a control segment to establish a connection flow at a data flow segment.
Figure 9:
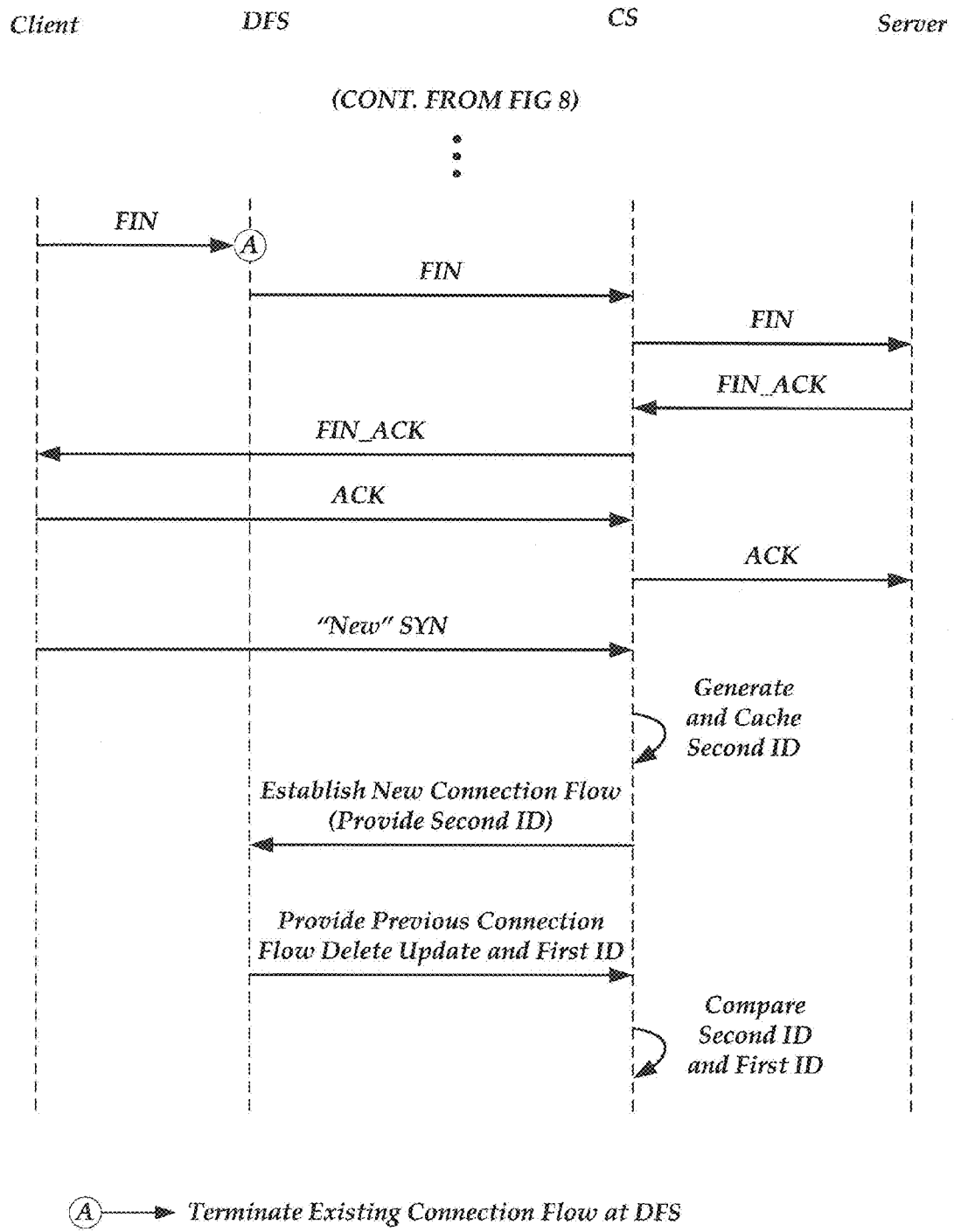
FIG. 9 illustrates a sequence diagram generally showing one embodiment of a sequence for terminating a connection flow at a data flow segment and determining if a previous connection flow delete update received at a control segment from the data flow segment is valid after establishing a new connection flow at the data flow segment.

FIGS. 8 and 9 illustrate sequence diagrams generally showing one embodiment of a sequence for a CS to establish a connection flow at a DFS and to determine if a previous connection flow delete update received at the CS from the DFS is valid. Sequence 800 of FIG. 8 and sequence 900 of FIG. 9 may be performed between a client, a DFS, a CS, and a server. In some embodiments, the client may be a client device, such as client devices 402-403 of FIG. 4A and the server may be a server device, such as server devices 410-411 of FIG. 4A. The DFS may be an embodiment of DFS 406 of FIG. 4A and the CS may be an embodiment of CS 408 of FIG. 4A. The following sequences may employ embodiments as described above in conjunction with FIGS. 1-7.

FIG. 8 illustrates a sequence diagram generally showing one embodiment of a sequence for a CS to establish a connection flow at a DFS. In one embodiment, sequence 800 may utilize a TCP handshake for establishing the connection flow at the DFS. Sequence 800 starts with the CS receiving a SYN from the client. The CS then generates and caches a first identifier for the received SYN. In some embodiments, the first identifier may be based on a sequence number of the SYN, such as, but not limited to a hash of the sequence number. The CS then establishes a connection flow at the DFS. In some embodiments, the CS may perform a load balancing operation to determine a corresponding server for the connection flow. In establishing the connection flow, the CS may provide processing instructions (e.g., packet address translation instructions) and the first identifier to the DFS. In some embodiments, the DFS may store the processing instructions and the first identifier in a local memory. The DFS may then forward the SYN to the server.

The establishment of the connection flow at the DFS between the client and the server may be finalized by the exchange of a SYN_ACK and an ACK. For example, the server may send a SYN_ACK to the DFS in response to the receipt of the SYN. The DFS may forward the SYN_ACK to the client. In some embodiments, the DFS may perform a packet translation on the SYN_ACK based on the processing instructions received from the CS to forward the packet to the client. In one embodiment, the DFS may notify the CS (not shown) that the SYN_ACK was received from the server. In response to the SYN_ACK, the client may send an ACK to the DFS, which may be forwarded to the server. In some embodiments, the DFS may perform a packet translation on the ACK based on the processing instructions received from the CS to forward the packet to the server. In at least one of the various embodiments, the DFS may notify the CS (not shown) that the ACK was received from the client. In one embodiment, the DFS and/or the CS may identify a state of the connection flow as "established" when the ACK is forwarded to the server. Sequence 800 may continue with sequence 900 of FIG. 9.

FIG. 9 illustrates a sequence diagram generally showing one embodiment of a sequence for terminating a connection flow at the DFS and determining if a previous connection flow delete update received at the CS from the data flow segment is valid after establishing a new connection flow at the data flow segment. In some embodiments, sequence 900 may utilize a TCP handshake for terminating the connection flow at the DFS. Sequence 900 may be a continuation of sequence 800 of FIG. 8.

At some time after establishing a connection flow at the DFS (e.g., by sequence 800 of FIG. 8), the client may send a FIN to the DFS. The DFS may terminate the established connection flow. In one embodiment, the DFS may terminate an established connection flow by deleting and/or otherwise invalidating processing instructions associated with the established connection flow. The DFS may forward the FIN to the CS, which may then forward the FIN to the server. In response to receiving the FIN, the server may reply to the CS with a FIN_ACK, which may be forwarded to the client from the CS. After receiving the FIN_ACK, the client may send an ACK to the CS. The CS may then forward the ACK to the server to indicate a closed connection flow between the client and the server. In some other embodiments, packets associated with terminating a connection flow may be forwarded between the client and the server through the DFS, such that the DFS and CS communicate regarding the handling of the forwarded packets. For example, the DFS may forward the FIN received from the client to the server and may notify the CS of the forwarded FIN.

At some point after terminating the previous connection flow, the client may send a new SYN to the CS. Upon receipt of the new SYN, the CS may generate and cache a second identifier for the new SYN. In some embodiments, the second identifier may be based on a sequence number of the new SYN. The CS then establishes a new connection flow at the DFS, which may include providing processing instructions and the second identifier to the DFS. Establishing the new connection flow may be finalized by finishing a TCP handshake, such as described above in conjunction with sequence 800 of FIG. 8.

In some embodiments, the DFS may send a previous connection flow delete update with the first identifier to the CS for the previous connection flow that was terminated. Sequence 900 illustrates the DFS sending the previous connection flow delete update to the CS after the new connection flow is established at the DFS. However, the invention is not so limited, but rather, the DFS may send a connection flow update, including a connection flow delete update, to the CS at virtually any time after a connection flow is established at the DFS.

The CS may then compare the cached second identifier and the first identifier received from the DFS. As shown in sequence 900, the second identifier and the first identifier may be different because the first identifier was generated from the previous connection flow and the second identifier was generated from the new connection flow. In such an embodiment, if the second identifier and the first identifier are different, then the previous connection flow delete update may be identified as invalid.

Sequence 800 and 900 are not to be construed as limiting or exhaustive, and some of the events of sequence 800 and/or sequence 900 may occur in a different order than shown in FIGS. 8 and 9. In one non-limiting, non-exhaustive example, the CS may receive a new SYN from the client after the DFS provides the previous connection flow delete update and first identifier to the CS. In another non-limiting, non-exhaustive example, the DFS may send a connection flow update to the CS before a FIN is received from the client.

Figure 10:
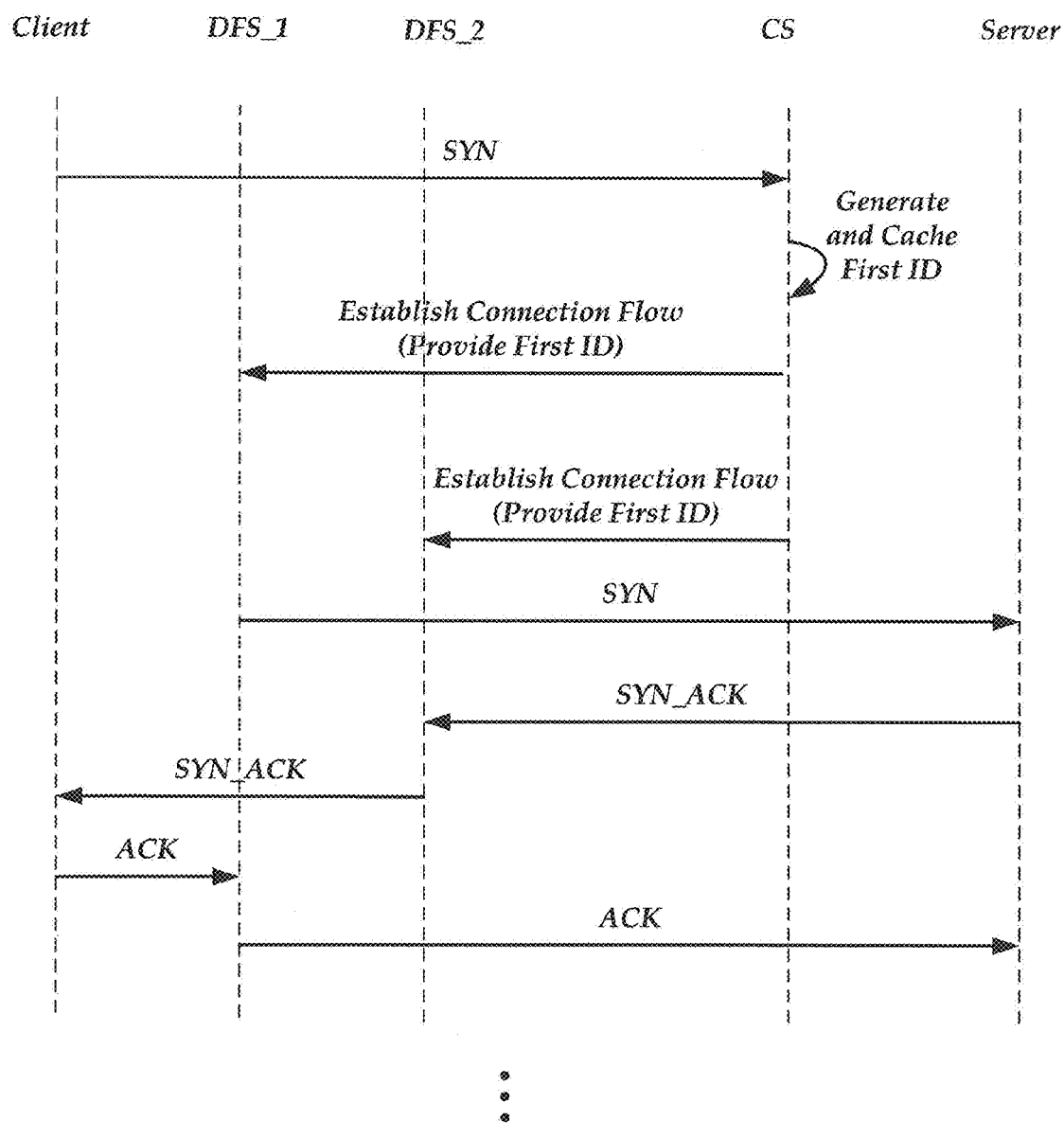
FIG. 10 shows a sequence diagram generally showing one embodiment of a sequence for a control segment to establish a first connection flow at a first data flow segment and a second connection flow at a second data flow segment.
Figure 11A:
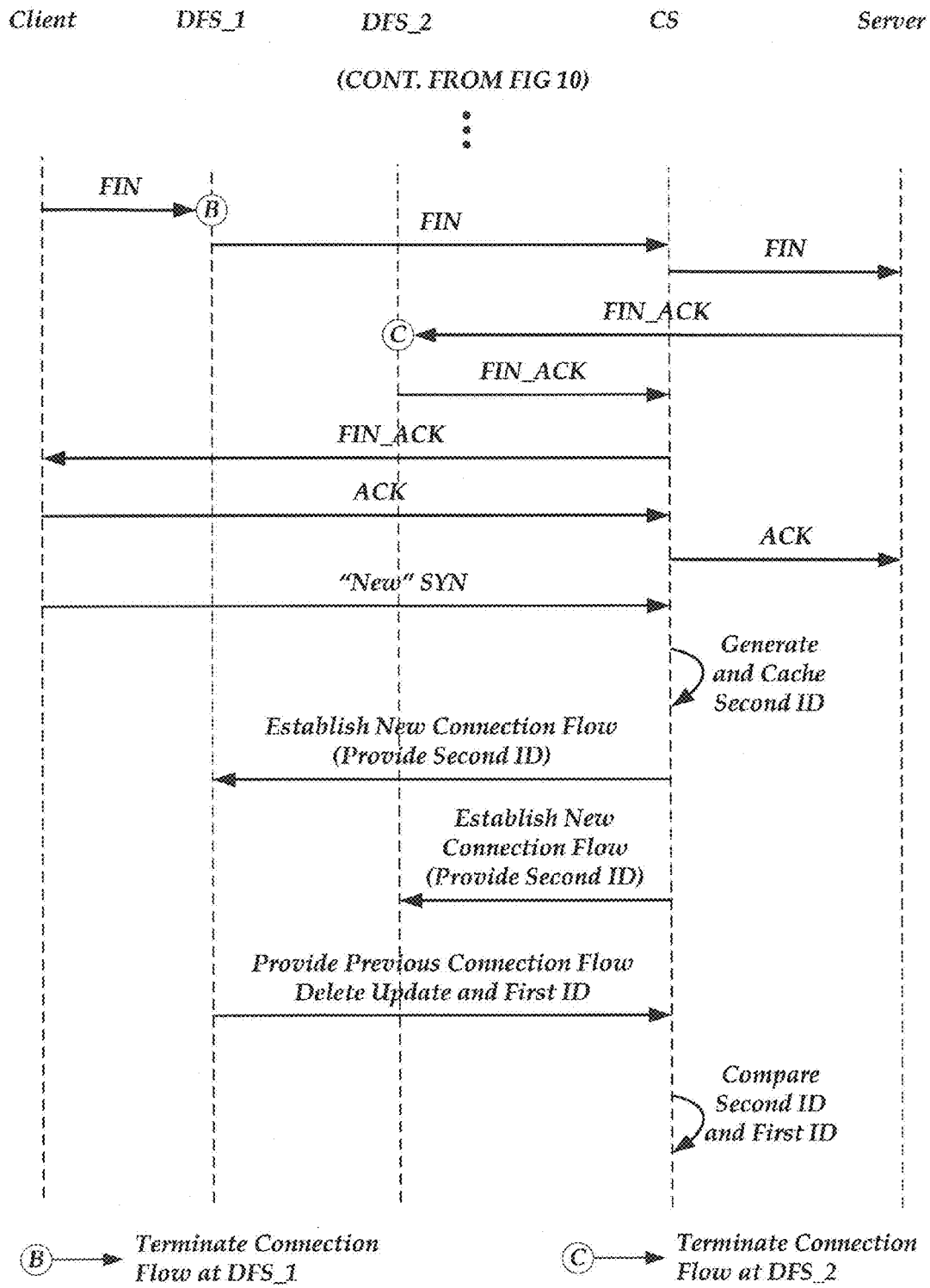
FIGS. 11A and 11B illustrate sequence diagrams generally showing embodiments of a sequence for terminating a connection flow at a first and second data flow segment and determining if a previous connection flow delete update received at a control segment from the first and/or second data flow segment is valid after establishing a new connection flow at the first and second data flow segments.
Figure 11B:
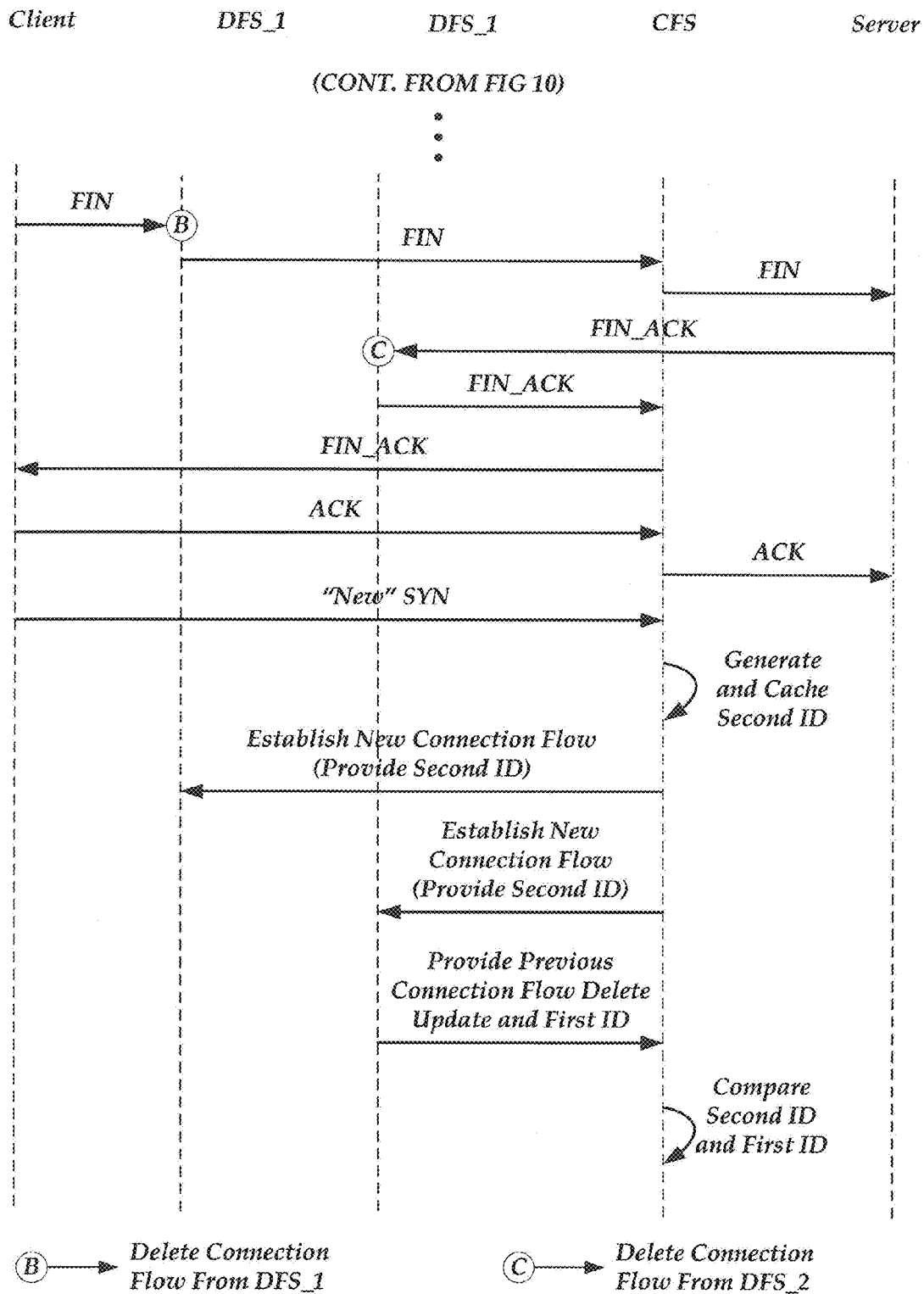

FIGS. 10 and 11A illustrate sequence diagrams generally showing one embodiment of a sequence for a CS to establish a first connection flow at a first DFS and a second connection flow at a second DFS and to determine if a previous connection flow delete update received at the CS from the first DFS is valid. FIG. 11B illustrates an alternative embodiment of FIG. 11A. Sequence 1000 of FIG. 10, sequence 1100A of FIG. 11A, and sequence 1100B of FIG. 11B may be performed between a client, DFS_1, DFS_2, a CS, and a server. In some embodiments, the client may be a client device, such as client devices 402-403 of FIG. 4A and the server may be a server device, such as server devices 410-411 of FIG. 4A. DFS_1 may be an embodiment of DFS 406 of FIG. 4B and DFS_2 may be an embodiment of DFS 407 of FIG. 4B. The CS may be an embodiment of CS 408 of FIG. 4B. In one embodiment, DFS_1 may be configured to receive data from the client and forward it to the server and DFS_2 may be configured to receive data from the server and forward it to the client. The following sequence may employ embodiments as described above in conjunction with FIGS. 1-7.

FIG. 10 illustrates a sequence diagram generally showing one embodiment of a sequence for a CS to establish a first connection flow at a first DFS and a second connection flow at a second DFS. In one embodiment, sequence 1000 may utilize TCP handshakes for establishing connection flows at the first and second DFS. Sequence 1000 may begin with the CS receiving a SYN from the client. The CS then generates and caches a first identifier for the received SYN. In some embodiments, the first identifier may be based on a sequence number of the SYN. The CS then establishes a connection flow at DFS_1 and a connection flow at DFS_2. In some embodiments, the CS may perform a load balancing operation to determine a corresponding server for the connection flows. In establishing the connection flows, the CS may provide processing instructions (e.g., packet address translation instructions) and the first identifier to DFS_1 and DFS_2. In some embodiments, DFS_1 and DFS_2 may store the processing instructions and the first identifier in local memories. DFS_1 may then forward the SYN to the server.

The establishment of the connection flows at DFS_1 and DFS_2 may be finalized by the exchange of a SYN_ACK and an ACK. For example, the server may send a SYN_ACK to DFS_2 in response to the receipt of the SYN. DFS_2 may forward the SYN_ACK to the client. In some embodiments, DFS_2 may perform a packet translation on the SYN_ACK based on the processing instructions received from the CS to forward the packet to the client. In one embodiment, DFS_2 may notify the CS (not shown) that the SYN_ACK was received from the server. In response to the SYN_ACK, the client may send an ACK to DFS_1, which may be forwarded to the server. In some embodiments, DFS_1 may perform a packet translation on the ACK based on the processing instructions received from the CS to forward the packet to the server. In at least one of the various embodiments, DFS_1 may notify the CS (not shown) that the ACK was received from the client. Sequence 1000 may continue with sequence 1100A of FIG. 11A or sequence 1100B of FIG. 11B.

FIGS. 11A and 11B illustrate sequence diagrams generally showing alternative embodiments of a sequence for terminating a connection flow at a first and second DFS and determining if a previous connection flow delete update received at the CS from the first or second DFS is valid after establishing a new connection flow at the first and second DFS. In some embodiments, sequence 1100A and sequence 1100B may utilize a TCP handshake for terminating the connection flows at DFS_1 and DFS_2.

Sequence 1100A may be a continuation of sequence 1000 of FIG. 10. At some time after establishing connection flows at DFS_1 and DFS_2 (e.g., by sequence 1000 of FIG. 10), the client may send a FIN to DFS_1. DFS_1 may terminate the established connection flow at DFS_1. DFS_1 may forward the FIN to the CS, which may then forward the FIN to the server. In response to receiving the FIN, the server may reply to DFS_2 with a FIN_ACK. DFS_2 may terminate the established connection flow at DFS_2. In some embodiments, DFS_1 and/or DFS_2 may terminate an established connection flow by deleting and/or otherwise invalidating processing instructions associated with the established connection flow. DFS_2 may forward the FIN_ACK to the CS, which may forward the FIN_ACK to the client. After receiving the FIN_ACK, the client may send an ACK to the CS. The CS may then forward the ACK to the server to indicate a closed connection flow between the client and the server. In some embodiments, packets associated with terminating a connection flow may be forwarded between the client and the server through DFS_1 and/or DFS_2, such that DFS_1 and DFS_2 communicate with the CS regarding the handling of the forwarded packets. For example, DFS_1 may forward the FIN received from the client to the server and may notify the CS of the forwarded FIN.

At some point after terminating the previous connection flows at DFS_1 and/or DFS_2, the client may send a new SYN to the CS. Upon receipt of the new SYN, the CS may generate and cache a second identifier for the new SYN. In some embodiments, the second identifier may be based on a sequence number of the new SYN. The CS then establishes new connection flows at DFS_1 and DFS_2, which may include providing processing instructions and the second identifier to DFS_1 and DFS_2. Establishing the new connection flows may be finalized by finishing a TCP handshake, such as described above in conjunction with sequence 1000 of FIG. 10.

In some embodiments, DFS_1 may send a previous connection flow delete update with the first identifier to the CS for the previous connection flow that was terminated. Sequence 1100A illustrates DFS_1 sending the previous connection flow delete update to the CS after the new connection flow is established at DFS_1. However, the invention is not so limited, but rather, DFS_1 may send a connection flow update, including a connection flow delete update, to the CS at virtually any time after a connection flow is established at DFS_1.

The CS may then compare the cached second identifier and the first identifier received from DFS_1. As shown in sequence 1100A, the second identifier and the first identifier may be different because the first identifier was generated from the previous connection flow and the second identifier was generated from the new connection flow. In such an embodiment, if the second identifier and the first identifier are different, then the previous connection flow delete update may be identified as invalid.

Sequence 1100B may be an alternative embodiment of sequence 1100A of FIG. 11A. Thus, sequence 1100B may be a continuation of sequence 1000 of FIG. 10. At some time after establishing connection flows at DFS_1 and DFS_2

(e.g., by sequence 1000 of FIG. 10), the client may send a FIN to DFS_1. DFS_1 may terminate the established connection flow at DFS_1. DFS_1 may forward the FIN to the CS, which may then forward the FIN to the server. In response to receiving the FIN, the server may reply to DFS_2 with a FIN_ACK. DFS_2 may terminate the established connection flow at DFS_2. In some embodiments, DFS_1 and/or DFS_2 may terminate an established connection flow by deleting and/or otherwise invalidating processing instructions associated with the established connection flow. DFS_2 may forward the FIN_ACK to the CS, which may forward the FIN_ACK to the client. After receiving the FIN_ACK, the client may send an ACK to the CS. The CS may then forward the ACK to the server to indicate a closed connection flow between the client and the server. In some embodiments, packets associated with terminating a connection flow may be forwarded between the client and the server through DFS_1 and/or DFS_2, such that DFS_1 and DFS_2 communicate with the CS regarding the handling of the forwarded packets. For example, DFS_1 may forward the FIN received from the client to the server and may notify the CS of the forwarded FIN.

At some point after terminating the previous connection flows at DFS_1 and/or DFS_2, the client may send a new SYN to the CS. Upon receipt of the new SYN, the CS may generate and cache a second identifier for the new SYN. In some embodiments, the second identifier may be based on a sequence number of the new SYN. The CS then establishes new connection flows at DFS_1 and DFS_2, which may include providing processing instructions and the second identifier to DFS_1 and DFS_2. Establishing the new connection flows may be finalized by finishing a TCP handshake, such as described above in conjunction with sequence 1000 of FIG. 10.

In some embodiments, DFS_2 may send a previous connection flow delete update with the first identifier to the CS for the previous connection flow that was terminated. Sequence 1100B illustrates DFS_2 sending the previous connection flow delete update to the CS after the new connection flow is established at DFS_2. However, the invention is not so limited, but rather, DFS_2 may send a connection flow update, including a connection flow delete update, to the CS at virtually any time after a connection flow is established at DFS_2.

The CS may then compare the cached second identifier and the first identifier received from DFS_2. As shown in sequence 1100B, the second identifier and the first identifier may be different because the first identifier was generated from the previous connection flow and the second identifier was generated from the new connection flow. In such an embodiment, if the second identifier and the first identifier are different, then the previous connection flow delete update may be identified as invalid.

Sequence 1000 and 1100A-1100B are not to be construed as limiting or exhaustive, and some of the events of sequence 1000, sequence 1100A, and/or sequence 1100B may occur in a different order than shown in FIGS. 10, 11A, and 11B. In one non-limiting, non-exhaustive example, the CS may receive a new SYN from the client after DFS_1 and/or DFS_2 provide a previous connection flow delete update and first identifier to the CS. In another non-limiting, non-exhaustive example, DFS_1 and/or DFS_2 may send a connection flow update to the CS before a FIN is received from the client.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method for managing communication over a network, comprising the actions of:
providing a connection flow request to a traffic management device ("TMD") that is operative to manage communication between at least one client device and at least one server device, wherein the TMD includes a control segment ("CS") that handles at least one flow of control communication and two or more data flow segments ("DFS") that separately maintain an incoming direction and an outgoing direction for a flow of data communication;
employing the TMD to generate an identifier that corresponds to a connection flow based on the connection flow request, wherein the identifier is separate from a connection flow signature of the connection flow, and wherein the CS caches the identifier and provides the identifier to the two or more DFSs;
employing the CS to establish the connection flow between a client device and a server device that is based at least on the identifier and the connection flow request, wherein the two or more DFSs store the identifier separately from the CS;
employing the two or more DFSs to provide an update to the connection flow and the separately stored identifier to the CS;
comparing the identifier provided by the two or more DFSs to the CS to the identifier cached at the CS, wherein a match indicates the update is valid and a difference indicates the update is invalid; and
determining when the update is valid based on the comparison of the identifier provided by the two or more DFSs to the CS and the identifier cached at the CS, wherein a validated update is employed by the CS for further handling the control communication for the connection flow.

2. The method of claim 1, further comprising the action of employing instructions provided by the CS to perform packet translations with the two or more DFSs, wherein the instructions are based at least in part on a load balancing action performed by the CS.

3. The method of claim 1, further comprising the action of employing the two or more DFSs to split the connection flow into a first connection flow from the server device to the client device for maintaining by a first DFS and a second connection flow from the client device to the server device for maintaining by a second DFS, wherein the first connection flow and the second connection flow are both associated with the identifier that corresponds to the connection flow.

4. The method of claim 1, wherein generating the identifier further comprises performing at least one of a hash of a sequence number for the connection flow and an exclusive OR byte operation on the sequence number for the connection flow.

5. The method of claim 1, wherein the connection flow request is based on at least a SYN request from the client device.

6. The method of claim 1, further comprising the action of enabling the two or more DFSs to terminate the connection flow at the two or more DFSs by providing a connection flow delete update to the CS.

7. The method of claim 1, further comprising the actions of:

in response to a new connection flow request, generating another identifier for the new connection flow request and caching the other identifier at the CS;

employing the CS to enable the two or more DFSs to establish a new connection flow between the client device and the server device that is based at least on the other identifier and the new connection flow request, wherein the two or more DFSs stores the other identifier separately from the CS;

receiving an update for the new connection flow and its corresponding identifier; and determining if the update for the new connection flow is valid based on a comparison of its corresponding identifier and the other identifier stored by the two or more DFSs.

8. The method of claim 1, further comprising the actions of:

in response to a new connection flow request, generating another identifier for the new connection flow request;

identifying the new connection flow request as a Transmission Control Protocol ("TCP") SYN flood when the other identifier is different than the identifier and the new connection flow request has a same connection flow signature as the connection flow, wherein the new connection flow request identified as the TCP SYN flood is discarded; and identifying the new connection flow request as a TCP retransmitted SYN when the other identifier matches the identifier and the new connection flow request has a same connection flow signature as the connection flow, wherein the new connection flow request identified as the retransmitted TCP SYN is discarded.

9. The method of claim 1, wherein a subset of information within an invalidated update is employed to update a previously established connection while maintaining a status of the connection flow.

10. A traffic management device ("TMD") for managing communication over a network, comprising;

a network interface device for communicating over a network;

a memory device for storing instructions; and a processor device for executing instructions to enable actions, including:

processing a connection flow request that is operative to manage communication between at least one client device and at least one server device, wherein the TMD includes a control segment ("CS") that handles at least one flow of control communication and two or more data flow segments ("DFS") that separately maintain an incoming direction and an outgoing direction for a flow of data communication;

generating an identifier that corresponds to a connection flow based on the connection flow request, wherein the identifier is separate from a connection flow signature of the connection flow, and wherein the CS caches the identifier and provides the identifier to the two or more DFSs;

employing the CS to establish the connection flow between a client device and a server device that is based at least on the identifier and the connection flow request, wherein the two or more DFSs store the identifier separately from the CS;

employing the two or more DFSs to provide an update to the connection flow and the separately stored identifier to the CS;

comparing the identifier provided by the two or more DFSs to the CS to the identifier cached at the CS, wherein a match indicates the update is valid and a difference indicates the update is invalid; and determining when the update is valid based on the comparison of the identifier provided by the two or more DFSs to the CS and the identifier cached at the CS, wherein a validated update is employed by the CS for further handling the control communication for the connection flow.

11. The TMD of claim 10, further comprising the action of employing instructions provided by the CS to perform packet translations with the two or more DFSs, wherein the instructions are based at least in part on a load balancing action performed by the CS.

12. The TMD of claim 10, further comprising the action of employing the two or more DFSs to split the connection flow into a first connection flow from the server device to the client device and a second connection flow from the client device to the server device, wherein the first connection flow and the second connection flow are both associated with the identifier that corresponds to the connection flow.

13. The TMD of claim 10, wherein generating the identifier further comprises performing at least one of a hash of a sequence number for the connection flow and an exclusive OR byte operation on the sequence number for the connection flow.

14. The TMD of claim 10, wherein the connection flow request is based on at least a SYN request from the client device.

15. The TMD of claim 10, further comprising the action of enabling the two or more DFSs to terminate the connection flow at the two or more DFSs by providing a connection flow delete update to the CS.

16. The TMD of claim 10, further comprising the actions of:

in response to a new connection flow request, generating another identifier for the new connection flow request and caching the other identifier at the CS;

employing the CS to enable the two or more DFS to establish a new connection flow between the client device and the server device that is based at least on the other identifier and the new connection flow request, wherein the two or more DFSs store the other identifier separately from the CS;

receiving an update for the new connection flow and its corresponding identifier; and determining when the update for the new connection flow is valid based on a comparison of its corresponding identifier and the other identifier stored by the two or more DFSs.

17. The TMD of claim 10, further comprising the actions of:

in response to a new connection flow request, generating another identifier for the new connection flow request;

identifying the new connection flow request as a Transmission Control Protocol ("TCP") SYN flood if the other identifier is different than the identifier and the new connection flow request has a same connection flow signature as the connection flow, wherein the new connection flow request identified as the TCP SYN flood is discarded; and identifying the new connection flow request as a TCP retransmitted SYN when the other identifier matches the identifier and the new connection flow request has a same connection flow signature as the connection flow, wherein the new connection flow request identified as the retransmitted TCP SYN is discarded.

18. A system for managing communication over a network, comprising:
  a client device;
  a server device; and
  a traffic management device ("TMD"), including:
    a network interface device for communicating over a network;
    a memory device for storing instructions; and
    a processor device for executing instructions to enable actions, including:
      processing a connection flow request that is operative to manage communication between at least one client device and at least one server device, wherein the TMD includes a control segment ("CS") that handles at least one flow of control communication and two or more data flow segments ("DFS") that separately maintain an incoming direction and an outgoing direction for a flow of data communication;
      generating an identifier that corresponds to a connection flow based on the connection flow request, wherein the identifier is separate from a connection flow signature of the connection flow, and wherein the CS caches the identifier and provides the identifier to the two or more DFSs;
      employing the CS to establish the connection flow between a client device and a server device that is based at least on the identifier and the connection flow request, wherein the two or more DFSs store the identifier separately from the CS;
      employing the two or more DFSs to provide an update to the connection flow and the separately stored identifier to the CS;
      comparing the identifier provided by the two or more DFSs to the CS to the identifier cached at the CS, wherein a match indicates the update is valid and a difference indicates the update is invalid; and
      determining when the update is valid based on the comparison of the identifier provided by the two or more DFSs to the CS and the identifier cached at the CS, wherein a validated update is employed by the CS for further handling the control communication for the connection flow.

19. The system of claim 18, further comprising the action of employing instructions provided by the CS to perform packet translations with the two or more DFSs, wherein the instructions are based at least in part on a load balancing action performed by the CS.

20. The system of claim 18, further comprising the action of employing the two or more DFSs to split the connection flow into a first connection flow from the server device to the client device and a second connection flow from the client device to the server device, wherein the first connection flow and the second connection flow are both associated with the identifier that corresponds to the connection flow.

21. The system of claim 18, wherein generating the identifier further comprises performing at least one of a hash of a sequence number for the connection flow and an exclusive OR byte operation on the sequence number for the connection flow.

22. The system of claim 18, further comprising the action of enabling the two or more DFSs to terminate the connection flow at the two or more DFSs by providing a connection flow delete update to the CS.

23. The system of claim 18, further comprising the actions of:
  in response to a new connection flow request, generating another identifier for the new connection flow request and caching the other identifier at the CS;
  employing the CS to enable the two or more DFSs to establish a new connection flow between the client device and the server device that is based at least on the other identifier and the new connection flow request, wherein the two or more DFSs stores the other identifier separately from the CS;
  receiving an update for the new connection flow and its corresponding identifier; and
  determining when the update for the new connection flow is valid based on a comparison of its corresponding identifier and the other identifier stored by the two or more DFSs.

24. The system of claim 18, further comprising the actions of:
  in response to a new connection flow request, generating another identifier for the new connection flow request;
  identifying the new connection flow request as a Transmission Control Protocol ("TCP") SYN flood when the other identifier is different than the identifier and the new connection flow request has a same connection flow signature as the connection flow, wherein the new connection flow request identified as the TCP SYN flood is discarded; and
  identifying the new connection flow request as a TCP retransmitted SYN when the other identifier matches the identifier and the new connection flow request has a same connection flow signature as the connection flow, wherein the new connection flow request identified as the retransmitted TCP SYN is discarded.

25. A processor readable non-transitive storage media that includes instructions for managing communication over a network, wherein the execution of the instructions by a network device enables actions, comprising:
  providing a connection flow request to a traffic management device ("TMD") that is operative to manage communication between at least one client device and at least one server device, wherein the TMD includes a control segment ("CS") that handles at least one flow of control communication and two or more data flow segments ("DFS") that maintain at least one flow of data communication;
  employing the TMD to generate an identifier that corresponds to a connection flow based on the connection flow request, wherein the identifier is separate from a connection flow signature of the connection flow, and wherein the CS caches the identifier and provides the identifier to the two or more DFSs;
  employing the CS to establish the connection flow between a client device and a server device that is based at least on the identifier and the connection flow request, wherein the two or more DFSs store the identifier separately from the CS;
  employing the two or more DFSs to provide an update to the connection flow and the separately stored identifier to the CS;
  comparing the identifier provided by the two or more DFSs to the CS to the identifier cached at the CS, wherein a match indicates the update is valid and a difference indicates the update is invalid; and
  determining when the update is valid based on the comparison of the identifier provided by the two or more DFSs to the CS and the identifier cached at the CS, wherein a validated update is employed by the CS for further handling the control communication for the connection flow.

26. The media of claim 25, further comprising the action of employing the two or more DFS to split the connection flow into a first connection flow from the server device to the client device and a second connection flow from the client device to the server device, wherein the first connection flow and the second connection flow are both associated with the identifier that corresponds to the connection flow.

27. The media of claim 25, further comprising the actions of:
  in response to a new connection flow request, generating another identifier for the new connection flow request and caching the other identifier at the CS;
  employing the CS to enable the two or more DFSs to establish a new connection flow between the client device and the server device that is based at least on the other identifier and the new connection flow request, wherein the two or more DFSs store the other identifier separately from the CS;
  receiving an update for the new connection flow and its corresponding identifier; and
  determining when the update for the new connection flow is valid based on a comparison of its corresponding identifier and the other identifier stored by the two or more DFSs.

28. The media of claim 25, further comprising the actions of:
  in response to a new connection flow request, generating another identifier for the new connection flow request;
  identifying the new connection flow request as a Transmission Control Protocol ("TCP") SYN flood if the other identifier is different than the identifier and the new connection flow request has a same connection flow signature as the connection flow, wherein the new connection flow request identified as the TCP SYN flood is discarded; and
  identifying the new connection flow request as a TCP retransmitted SYN when the other identifier matches the identifier and the new connection flow request has a same connection flow signature as the connection flow, wherein the new connection flow request identified as the retransmitted TCP SYN is discarded.

* * * * *